(12) United States Patent
Onoda et al.

(10) Patent No.: US 8,256,893 B2
(45) Date of Patent: Sep. 4, 2012

(54) HOLDING STRUCTURES FOR SPECTACLE LENSES, SPECTACLES, AND METHOD OF MANUFACTURING SPECTACLES

(75) Inventors: Norihisa Onoda, Tokyo (JP); Asako Kawano, Tokyo (JP); Yukihiro Izumitani, Tokyo (JP); Yasushi Sakai, Tokyo (JP)

(73) Assignee: Hoya Corporation, Tokyo (JP)

( * ) Notice: Subject to any disclaimer, the term of this patent is extended or adjusted under 35 U.S.C. 154(b) by 168 days.

(21) Appl. No.: 12/989,064

(22) PCT Filed: Apr. 22, 2009

(86) PCT No.: PCT/JP2009/058017
§ 371 (c)(1),
(2), (4) Date: Oct. 21, 2010

(87) PCT Pub. No.: WO2009/131158
PCT Pub. Date: Oct. 29, 2009

(65) Prior Publication Data
US 2011/0037940 A1    Feb. 17, 2011

(30) Foreign Application Priority Data
Apr. 22, 2008    (JP) .................... 2008-111806

(51) Int. Cl.
*G02C 1/02*    (2006.01)

(52) U.S. Cl. ........... 351/110; 351/52; 351/140; 351/144
(58) Field of Classification Search ............ 351/51, 351/52, 110, 140, 142, 144, 149, 154
See application file for complete search history.

(56) References Cited

U.S. PATENT DOCUMENTS

| 5,646,706 A | 7/1997 | Izumitani |
| 6,293,671 B1 | 9/2001 | Masunaga |
| 7,086,733 B1 * | 8/2006 | Bac .............................. 351/110 |

FOREIGN PATENT DOCUMENTS

| JP | H07-230062 A | 8/1995 |
| JP | 2001-209009 A | 8/2001 |
| JP | 3242879 B | 10/2001 |
| JP | 2004-054076 A | 2/2004 |

* cited by examiner

*Primary Examiner* — Huy K Mai
(74) *Attorney, Agent, or Firm* — Blakely, Sokoloff, Taylor & Zafman

(57) ABSTRACT

A circumferentially elongated flat recessed portion (13) is formed in the outer edge surface (2c-b) of a spectacle lens (2). The distal end of a lens holding portion (9) is bent in a J shape to form an insertion portion (9A). The insertion portion (9A) is inserted into the recessed portion (13) and fixed in position using an adhesive (15). Thus, the spectacle lens (2) can be reliably held by the lens holding portion (9) with strong bonding between the spectacle lens (2) and the lens holding portion (9) free from the possibility of a reduction in bonding strength or fall-off upon twisting.

19 Claims, 14 Drawing Sheets

HOLDING STRUCTURES FOR SPECTACLE LENSES, SPECTACLES, AND METHOD OF MANUFACTURING SPECTACLES

This is a non-provisional application claiming the benefit of International application number PCT/JP2009/058017 filed Apr. 22, 2009.

TECHNICAL FIELD

The present invention relates to a holding structure for spectacle lenses, spectacles, and a method of manufacturing spectacles and, more particularly, to a holding structure for spectacle lenses, which is suitable for application to rimless type spectacles.

BACKGROUND ART

In recent years, rimless type spectacles (to be also simply referred to as rimless spectacles hereinafter) are attracting a great deal of attention from the viewpoint of advantages such as a wide field of view and a light weight. In known rimless type spectacles with such advantages, lenses are held by providing recesses in the lens edge surfaces, inserting lens holding portions provided on lens holding members such as end pieces and a bridge into the recesses, and fixing the lens holding portions in position using an adhesive (resin) (see, for example, Japanese Patent No. 2854531 (Japanese Patent Laid-Open No. H07-230062), Japanese Patent Laid-Open No. 2001-209009, and Japanese Patent No. 3242879).

In a holding structure for spectacle lenses described in Japanese Patent No. 2854531, two blind holes are formed in the edge surface of each spectacle lens, lens holding portions each including two pin-shaped projecting portions are provided on lens holding members for a spectacle frame, and the lens holding portions are fixed in position using an adhesive while the pin-shaped projecting portions are inserted in the blind holes.

In holding structures for spectacle lenses described in FIGS. 4 to 6 of Japanese Patent Laid-Open No. 2001-209009, holes which have circular cross-sections and are elongated in the thickness direction of spectacle lenses are formed to run through the spectacle lenses in the thickness direction. In addition, edge surface holes with elongated-hole-shaped cross-sections are formed in the lens edge surfaces to communicate with the holes in the thickness direction. Connection portions with cross-sectional shapes corresponding to the edge surface holes are provided on lens holding members for a spectacle frame, and an adhesive is filled into the edge surface holes. After that, the connection portions are fitted into the edge surface holes to make the adhesive partially flows out to the holes in the thickness direction, thereby fixing the connection portions in position.

In a holding structure for spectacle lenses described in Japanese Patent No. 3242879, attachment holes are formed in the edge surfaces of spectacle lenses, and recesses are provided in the side walls of the attachment holes. Locking projections having protruding portions which fit into the recesses are provided on lens holding members, and are inserted into the attachment holes. After that, the locking projections are fixed in position using an adhesive while the protruding portions are locked in the recesses by sliding the locking projections.

In this manner, in rimless spectacles in which lenses are held by providing recesses in the lens edge surfaces, inserting lens holding portions into the recesses, and fixing the lens holding portions in position using an adhesive, the lens holding portions do not project to the optical surfaces of the lenses. Hence, these spectacles have a wide effective field of view, and lens surfaces which are easy to wipe. Also, in these spectacles, the lenses are held without screws etc., and therefore can be reliably held free from loosening and play.

DISCLOSURE OF INVENTION

Problem to be Solved by the Invention

A holding structure which holds lenses by fitting lens holding portions in recesses in the lens edge surfaces in the foregoing way requires an arrangement for preventing the lens holding portions from rotating and falling off.

In the lens holding structure described in Japanese Patent No. 2854531, the rotation of the lens holding portions is prevented by inserting the two parallel pin-shaped projecting portions formed on lens holding members into the two parallel blind holes formed in the lens edge surfaces. Also, the fall-off of the lens holding portions is prevented by fixing the pin-shaped projecting portions and the blind holes in position using an adhesive.

In the lens holding structure described in Japanese Patent Laid-Open No. 2001-209009, the rotation of the lens holding portions is prevented by forming edge surface holes in the lens edge surfaces to have elongated-hole-shaped cross-sections, and forming flat connection portions between the lend edge surfaces and the lens holding members. Also, the fall-off of the lens holding portions is prevented by fixing the connection portions and the edge surface holes in position using an adhesive, and allowing the adhesive which has flowed out to the holes in the thickness direction and then solidified to function as a fall-off preventive anchor.

In the lens holding structure described in Japanese Patent No. 3242879, the fall-off of the lens holding portions is prevented by sliding the locking projections after they are inserted into the attachment holes to allow the protruding portions on the locking projections to fit into the recesses of the attachment holes, and fixing the locking projections in position using an adhesive. Also, the rotation of the lens holding portions is prevented by fitting together bonding members positioned on the protruding portions and slits positioned on the recesses of the attachment holes.

However, note that in the conventional rimless spectacles described in each of Japanese Patent No. 2854531 and Japanese Patent Laid-Open No. 2001-209009 mentioned above, straight holes are formed in the edge surfaces of spectacle lenses, lens holding portions of lens holding members are formed in a pin or plate shape, and the lens holding portions are inserted into holes or grooves and fixed using an adhesive. Hence, the resistances of the lens holding portions against pullout largely depend on the bonding force of the adhesive (that includes the bonding force between the hole inner surfaces and the lens holding portion outer surfaces, and that at the interfaces between the adhesive and the hole inner surfaces or the lens holding portion outer surfaces, and will also simply be referred to as the adhesive force hereinafter). This poses a problem that if the cured adhesive partially breaks or peels in the vicinities of the lens holding portions due to, for example, excessive external forces acting on the lenses or the lens holding members, the resistances against pullout decrease.

Also, note that in the rimless spectacles described in Japanese Patent No. 3242879 mentioned above, the lens holding portions are not only fixed in position using an adhesive but also have a locking structure between the recesses and the protruding portions. Hence, the lens holding portions have a relatively strong resistance against pullout but then have complex structures of the lens attachment holes and lens holding members. This makes it difficult to edge the lenses and manufacture the lens holding members.

Also, in the conventional rimless spectacles described in each of Japanese Patent No. 2854531, Japanese Patent Laid-Open No. 2001-209009, and Japanese Patent No. 3242879 mentioned above, if excessive external forces act on the lens holding portions in their rotation directions about the directions, in which the lens holding portions are inserted into the holes formed in the lens edge surfaces of the lens holding portions, as rotation axes, nonabsorbable forces generated upon, e.g., deformation of the lens holding members or temples often act on the hole inner surfaces of the lenses or the cured adhesive, thus inflicting damage on the lenses or the adhesive.

The present invention has been made to solve the above-mentioned conventional problems, and has as its object to provide a holding structure for spectacle lenses, which can prevent the fall-off and rotation of lens holding members with respect to spectacle lenses with a simple structure, can generate a high bonding strength between the spectacle lenses and the lens holding members, can reduce any damage inflicted on the spectacle lenses due to twisting acting on the bonding portions between the spectacle lenses and the lens holding members, and can prevent the lens holding members from falling off even if the adhesive in the vicinities of the lens holding portions partially peels or suffers damage, spectacles, and a method of manufacturing spectacles.

Means of Solution to the Problem

In order to achieve the above-mentioned object, according to an aspect of the present invention, there is provided a holding structure for spectacle lenses comprising a lens holding member which holds a spectacle lens in rimless type spectacles, wherein a recessed portion that is a flat hole which is narrow in a lens thickness direction is formed in an edge surface of the spectacle lens, the lens holding member comprises a wire-like lens holding portion which has one end connected to a main body of the lens holding member and is bent on a single plane, and is formed by being fixed in position using an adhesive while at least part of the lens holding portion is inserted in the recessed portion, and the lens holding portion comprises a bottom portion side bent portion bent along a bottom of the recessed portion, a proximal portion which connects one end of the bottom side bent portion to the main body of the lens holding member, and an extension portion extending from the other end of the bottom portion side bent portion.

According to another aspect of the present invention, there is provided spectacles comprising a holding structure for spectacle lenses defined in the above-mentioned aspect of the invention.

According to still another aspect of the present invention, there is provided a method of manufacturing spectacles, comprising the steps of forming a recessed portion in an edge surface of a spectacle lens, filling the recessed portion with an adhesive, inserting a lens holding portion of a lens holding member into the recessed portion, performing vacuum degassing of the adhesive, and curing the adhesive.

Effects of the Invention

According to an aspect of the present invention, a holding structure for spectacle lenses is formed by forming a flat recessed portion in the edge surface of a spectacle lens, providing a lens holding member with a lens holding portion which is a wire-like member bent on a single plane and includes a proximal portion, bottom side bent portion, and extension portion, inserting the lens holding portion into the recessed portion, filling the recessed portion with an adhesive, and solidifying the adhesive. Hence, not only the adhesive force of the adhesive but also the solidified adhesive prevents the lens holding member from moving in the direction in which it falls off the recessed portion, and the lens holding structure is therefore so robust against a tension that the bonding strength between the spectacle lens and the lens holding member can be increased.

Also, even if the adhesive partially peels or breaks around the lens holding portion, the solidified adhesive suppresses movement of the lens holding portion. Hence, the lens holding portion can be prevented from falling off or dropping off.

Also, the lens holding portion is made of a wire-like member bent on a single plane. Hence, the lens holding portion has a flat outer shape with a certain width, and therefore has a function of preventing rotation. In addition, twisting of the proximal portion of the lens holding portion can absorb twisting of the lens holding portion, and damage to the lens therefore can be suppressed.

Also, functions of fall-off prevention and rotation prevention can be realized with a simple structure. This makes it easy to manufacture the lens holding portion and attach it to the lens.

Also, in the present invention, when the adhesive reaches the opening of the recessed portion without sealing the opening by the lens holding portion of the lens holding member, air bubbles generated upon, e.g., polymerization or contraction of the adhesive can be reliably discharged and removed from the recessed portion by vacuum degassing.

Also, according to the present invention, the lens holding portion can be bent in various shapes such as a character, a figure, or a pattern as needed. Hence, the spectacles can be more innovative and novel in terms of design than ever before.

According to another aspect of the present invention, a method of manufacturing spectacles includes the step of performing vacuum degassing of the adhesive. Hence, since air bubbles generated by the adhesive can be removed, a high adhesive strength can be obtained, and the appearance of the spectacles can be improved.

BEST MODE FOR CARRYING OUT THE INVENTION

Figure 1:
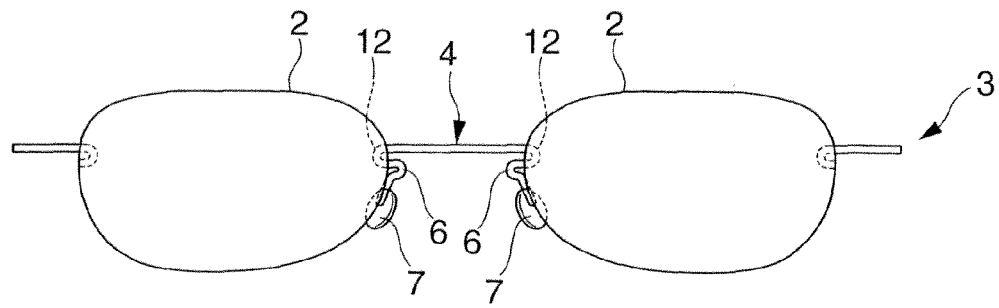
FIG. 1 is a front view of the front portion of spectacles, which shows an embodiment of spectacles to which a holding structure for spectacle lenses according to the present invention is applied.

The present invention will be described in detail with reference to embodiments shown in the accompanying drawings.

The schematic arrangement of spectacles and a lens holding structure according to the present invention will be described first.

Referring to FIGS. 1 to 6, spectacles 1 form rimless spectacles using a pair of left and right spectacle lenses 2, and a spectacle frame 3 which holds the spectacle lenses 2.

The spectacle lenses 2 are meniscus lenses made of plastic (synthetic resin), and each have a convex optical surface 2a, concave optical surface 2b, and edge surface 2c. Examples of spectacle plastic lenses are allyl lenses made of a copolymer containing diethylene glycol bisallyl carbonate (CR-39) or its mixture, polycarbonate lenses, acrylic lenses, bisphenol A derivative lenses, polyurethane lenses, polythiourethane lenses, and polyurethane urea lenses. Materials especially suitable for the holding structure for spectacle lenses according to the present invention are polyurethane lenses, polythiourethane lenses, and polyurethane urea lenses which are excellent in, e.g., impact resistance and tensile strength.

The spectacle frame 3 includes, e.g., a bridge 4, a pair of left and right nose pads 7, a pair of left and right end pieces (e.g., hinge type endpieces) 8, and a pair of left and right temples 11. The bridge 4 is disposed between the pair of spectacle lenses 2. The nose pads 7 are attached to the bridge 4 through nose pad legs 6. The end pieces 8 are disposed on the two outer sides (temple sides) of the spectacle lenses 2. The temples 11 are connected to the rear ends of the end pieces 8, respectively, to be openable/closable through hinges 10. The bridge 4 and the end pieces 8 are members which hold the spectacle lenses 2, and will also be referred to as the lens holding members 4 and 8 hereinafter.

The bridge 4 includes the bridge main body, and a pair of left and right nose-side lens holding portions 5. The nose-side lens holding portions 5 are wire-like portions integrally provided at the two ends of the bridge main body, and respectively hold edge surfaces 2c-a (to be also referred to as the inner edge surfaces 2c-a hereinafter) of the edge surfaces 2c of the spectacle lenses 2, which are on the inner sides (nose sides). The end pieces 8 include the end piece main bodies, and a pair of left and right temple-side lens holding portions 9. The temple-side lens holding portions 9 are wire-like portions integrally provided at the front ends of the end pieces 8, respectively, and respectively hold edge surfaces 2c-b (to be also referred to as the outer edge surfaces 2c-b hereinafter) of the edge surfaces 2c of the spectacle lenses 2, which are on the outer sides (temple sides). Note that the bridge main body of the bridge 4 and the end piece main bodies of the end pieces 8 are portions other than the nose-side lens holding portions 5 and temple-side lens holding portions 9, respectively, and will be generically referred to as the lens holding member main bodies. Also, the nose-side lens holding portions and temple-side lens holding portions will be generically referred to as the lens holding portions.

The bridge 4 is made of a metal material such as Ti, a Ti alloy, an iron alloy, 18-karat gold, 14-karat gold, nickel silver, Monel, high nickel, a nickel alloy such as stainless steel, or a copper alloy such as bronze or beryllium copper, or a resin such as polyamide, PAS, or PES. The bridge 4 and the spectacle lenses 2 are fixed on each other through the nose-side lens holding portions 5.

The nose-side lens holding portion 5 is formed by, e.g., bending or injection molding (when it is made of, for example, a resin) of a thin wire-like member made of the same material as the bridge 4. The nose-side lens holding portions 5 has at least part (a portion 5A, which will be referred to as the insertion portion 5A hereinafter) which is inserted in a recessed portion 12 formed in the inner edge surface 2c-a of the spectacle lens 2 and is fixed in position using an adhesive 15, thereby holding the spectacle lens 2.

The nose-side lens holding portion 5 is not limited to that formed integrally with the bridge 4 using the same material as the bridge 4, and may be formed separately from the bridge 4 and connected to the bridge main body by, e.g., brazing.

The wire-like member of the insertion portion 5A of the nose-side lens holding portion 5 preferably has a circular cross-sectional shape with a diameter within the range of 0.4 to 1.2 mm. However, this wire-like member may have, for example, a quadrangular or triangular cross-sectional shape other than a circular cross-sectional shape.

The portion (insertion portion 5A) of the nose-side lens holding portion 5, which holds the spectacle lens 2, can have various shapes formed by bending a wire-like member on a single plane, such as a J shape, a U shape, a V shape, a ⊐ shape, a W shape, an M shape, an N shape, a spiral shape, a shape like a three-leaf clover, a character shape, a graphic shape, a pattern shape, or a combination thereof, as will be described later.

The size of the insertion portion 5A of the nose-side lens holding portion 5 can be arbitrarily set as long as the spectacle wearer's view is not obstructed. However, the length of the insertion portion 5A in the direction in which it is inserted into a recessed portion 12 in the lens 2 (to be also referred to as the depth of connection to the lens 2 hereinafter) preferably falls within the range of 1.5 to 4.0 mm. Also, the vertical width (the width in the vertical direction) of the nose-side lens holding portion 5 preferably falls within the range of 2.5 to 6 times the diameter of its wire-like member.

The recessed portion 12 in the spectacle lens 2 is a flat blind hole which is formed in the inner edge surface 2c-a of the spectacle lens 2 and is narrow in the lens thickness direction. The thickness width (the width in the lens thickness direction) of the recessed portion 12 is set slightly larger than the thickness of the portion (insertion portion 5A) of the nose-side lens holding portion 5, which is inserted in the recessed portion 12 (or the diameter of the insertion portion 5A if its wire-like member has a circular cross-section). The depth of the recessed portion 12 is desirably set in accordance with the depth of connection to the insertion portion 5A (preferably falls within the range of 1.5 to 4.0 mm). Also, the opening length of the recessed portion 12 is desirably set equal to or slightly longer than the maximum value of the vertical width of the insertion portion 5A. The inner surface of the recessed portion 12 includes a pair of parallel inner wall surfaces opposed to each other in the lens thickness direction, and an inner edge surface which connects the peripheral edges of the pair of inner wall surfaces. This inner edge surface includes a bottom portion positioned in the bottom of the recessed portion, and a pair of side portions which reach the opening of the recessed portion from the two ends, respectively, of the bottom portion. The shape of the cross-section of the recessed portion 12 taken along its central line in the widthwise direction (its shape when seen through the spectacle lenses 2) can take various forms. For example, this cross-section can be formed in rectangles (FIGS. 11, 14, 22, and 24), semiellipses in each of which the bottom portion is curved in an arc (FIGS. 7 to 10, 18, 19, 21, and 25), triangles (FIGS. 12, 13, and 20), polygons or rough rectangles in each of which the bottom portion has at least one deformed portion (FIGS. 15 to 17 and 26 to 28), or a pentagon in which the bottom portion has a V shape (FIG. 23). The pair of side portions of the recessed portion 12 preferably have a constant interval between them or an interval between them, that gets larger in a direction closer to the opening of the recessed portion 12, because this facilitates removal of air bubbles generated by the adhesive which fills the recessed portion 12. Also, the bottom portion is preferably flat or recessed because this makes hard for the air bubbles to remain in the adhesive which fills the recessed portion 12.

Figure 2:
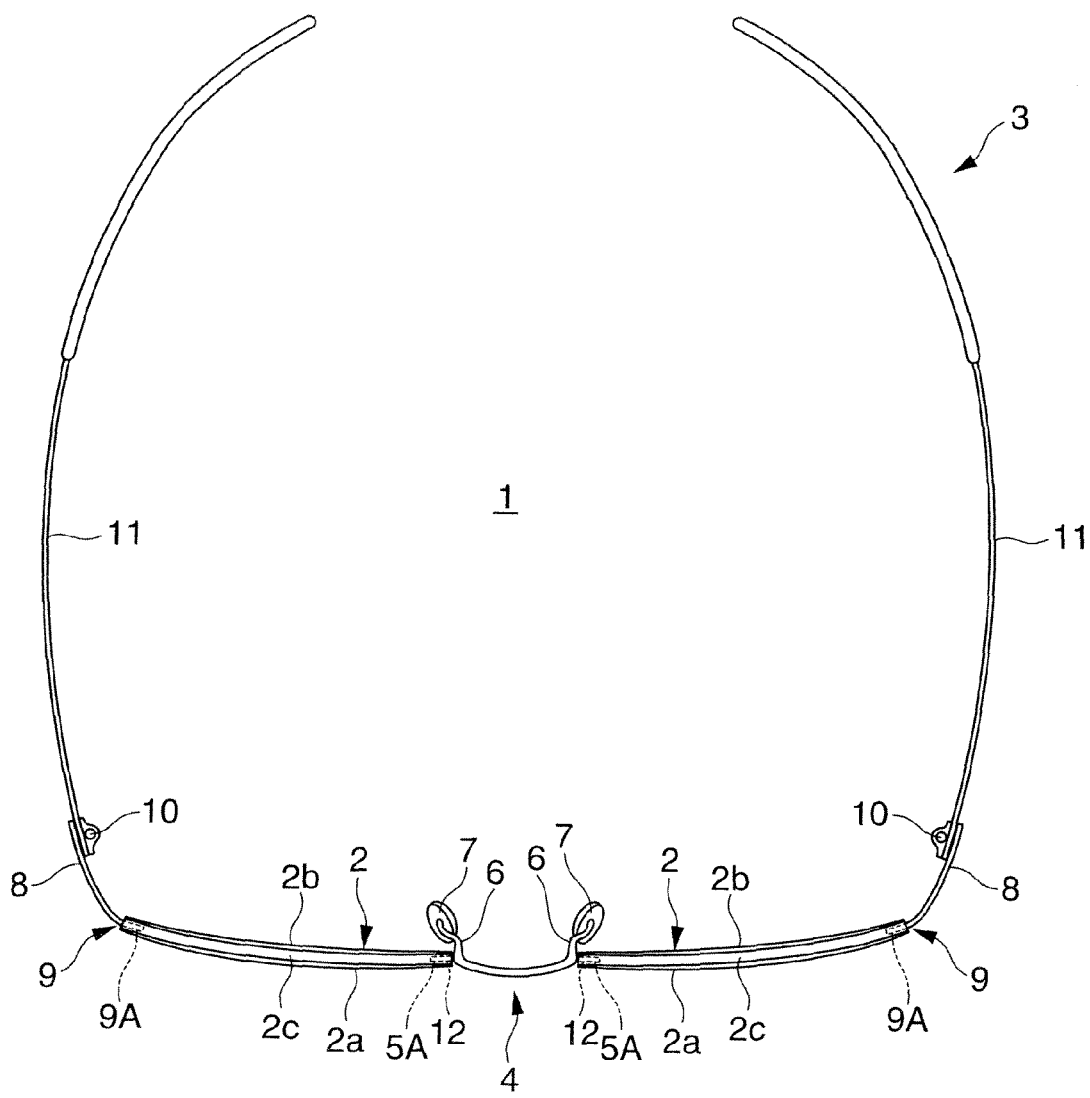
FIG. 2 is a plan view of the spectacles.
Figure 3:
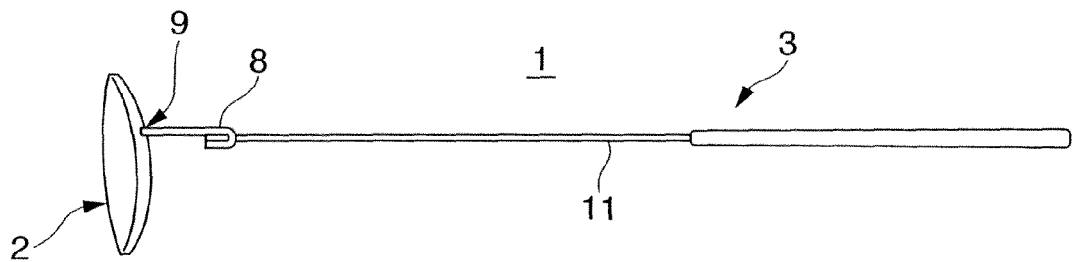
FIG. 3 is a side view of the spectacles.
Figure 4:
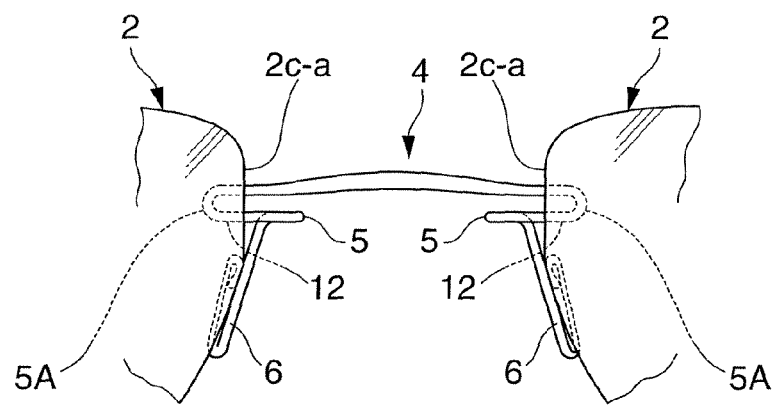
FIG. 4 is a front view of a lens holding member attached to the outer edge surfaces of spectacle lenses.
Figure 5:
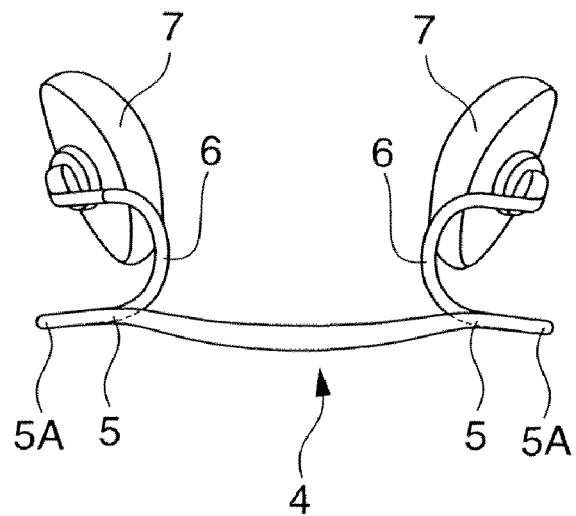
FIG. 5 is a front view of a nose-side lens holding member which holds the inner edge surfaces of the spectacle lenses.
Figure 6:
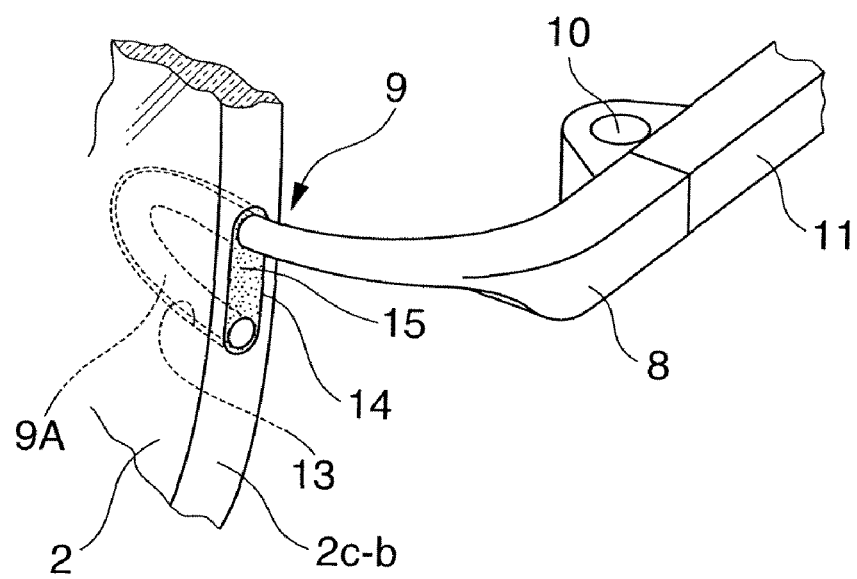
FIG. 6 is an external perspective view of a lens holding member attached to the outer edge surface of the spectacle lens.

The recessed portion 12 with the foregoing structure can be formed by punching a hole in the lens 2 using an end mill. Note that if the wire-like member of the insertion portion 5A has a circular cross-section, a ball end mill is preferably used as the end mill. In this case, since the adhesive layer can be thin as the inner edge surface of the recessed portion 12 is in proximity to a portion positioned on the outer periphery of the insertion portion 5A, their bonding force can be large. In the punching, the recessed portion 12 is obliquely formed to be nearly perpendicular to the edge surface 2c of the spectacle lens 2 or to be inclined toward the surface of the spectacle lens 2. In this case, the punching position and depth are desirably set such that the thickness of the lens front surface on the front side with respect to the recessed portion 12, and that of the lens rear surface on the rear side with respect to the recessed portion 12 are equal to or larger than predetermined values large enough to obtain a sufficient strength. Note that the spectacle lens 2 normally has a convex curve on the front surface (obverse surface) 2a, and a concave curve on the rear surface (reverse surface) 2c, as shown in FIGS. 2 and 3. Hence, when the recessed portion 12 is formed perpendicularly to the edge surface 2c, the lens rear surface on the rear side with respect to the recessed portion 12 becomes thin on the bottom side of the recessed portion 12, and the strength of a lens portion on the rear side then becomes weaker than the front side. In this embodiment, this drawback is overcome by forming the recessed portion 12 to be inclined such that the thicknesses of the lens front surface and lens rear surface are nearly the same or have the same ratio between the bottom and opening sides of the recessed portion 12. Alternatively, the recessed portion 12 may be inclined so as to match the curve of the lens front surface (i.e., such that the lens front surface has nearly the same thickness between the bottom and opening sides of the recessed portion 12), or inclined so as to match the curve of the lens rear surface (i.e., such that the lens rear surface has nearly the same thickness between the bottom and opening sides of the recessed portion 12).

The end piece 8 is formed by bending a member made of the same material as the bridge 4 to have an L shape when viewed from the plan view perspective, and has its front edge which forms the temple-side lens holding portion 9, and its rear edge foldably connected to the temple 11 via the hinge 10. Also, the end piece 8 is formed in a prismatic shape in this embodiment to ensure a strength high enough to allow it to withstand deformation, and to facilitate attachment of the hinge 10. Also, in this embodiment, the end piece 8 and the temple-side lens holding portion 9 are integrally formed using β titanium alloy.

The temple-side lens holding portion 9 is made of the same material as the end piece 8, and is formed in a shape in which a thin wire-like member is bent, like the nose-side lens holding portion 5. The temple-side lens holding portion 9 has at least part (a portion 9A, which will be referred to as the insertion portion 9A hereinafter) which is inserted in a recessed portion 13 formed in the inner edge surface 2c-a of the spectacle lens 2 and is fixed in position using an adhesive 15, thereby holding the spectacle lens 2. The insertion portion 9A inserted in the recessed portion 13 in the temple-side lens holding portion 9 is formed by being bent on a single plane, like the insertion portion 5A of the nose-side lens holding portion 5 mentioned above, to have the same shape and size as the insertion portion 5A. Also, the cross-section of the wire-like member which forms the insertion portion 9A is formed in the same shape as the insertion portion 5A.

The recessed portion 13 is different from the recessed portion 12 formed in the inner edge surface 2c-a only in that the former is formed in the outer edge surface 2c-b of the spectacle lens 2, and has the same shape and size as the latter. That is, the recessed portion 13 includes a flat blind hole which has an opening 14 which is elongated in the circumferential direction of the outer edge surface 2c-b of the spectacle lens 2 and is narrow in the lens thickness direction, and has a thickness set slightly larger than the diameter of the insertion portion 9A of the temple-side lens holding portion 9.

The adhesive 15 can be, e.g., an epoxy adhesive (available from, e.g., ThreeBond Co., Ltd.), an acrylic adhesive, an cyanoacrylate adhesive (available from, e.g., ThreeBond Co., Ltd.), or an anaerobic adhesive (available from, e.g., Henkel Loctite Corporation). Especially an epoxy adhesive is preferable because it is excellent in adhesion effect regardless of the lens material. Also, the adhesive 15 used has a viscosity as low as 3,000 poise at 25° C. and has high transparency. A low-viscosity adhesive is excellent in workability because it generates only little air bubbles. Note that if an acrylic lens is used as the spectacle lens 2, the adhesive 15 desirably is an epoxy adhesive because this acrylic lens is generally vulnerable to a specific solvent. The use of such an adhesive 15 is very preferable because this strengthens the bonding between the spectacle lens 2 and the nose-side lens holding portions 5 and 9, and is estimated to produce a complementary action to, e.g., optical distortions and microcracks (invisible cracks) around the holes, which are expected to be generated in the process of forming the recessed portions 12 and 13. The adhesive 15 is preferable because its transparent component does riot obstruct the field of view, and the decorative shapes of the insertion portions 5A and 9A of the nose-side lens holding portions 5 and 9, respectively, can be visually recognized from the front side. A semitransparent or opaque adhesive may be used, or a colored, transparent, semitransparent, or opaque adhesive may be used.

Detailed embodiments of the lens holding structure will be described in detail next with reference to FIGS. 7 to 30.

Although FIGS. 7 to 30 each show an example in which the present invention is applied to a holding structure formed by the temple-side lens holding portions 9 which hold the outer edge surfaces 2c-b of the spectacle lenses 2, the present invention is also applicable to a holding structure formed by the nose-side lens holding portions 5 which hold the inner edge surfaces 2c-a of the spectacle lenses 2 in exactly the same manner. Note that in the following description with reference to FIGS. 7 to 30, "temple-side lens holding portions 9" will simply be referred to as "lens holding portions 9". Note also that FIGS. 7 to 30 show the cross-sectional shapes of recessed portions 13, 30, 33, and 43 taken along their central lines in the widthwise direction.

Figure 7:
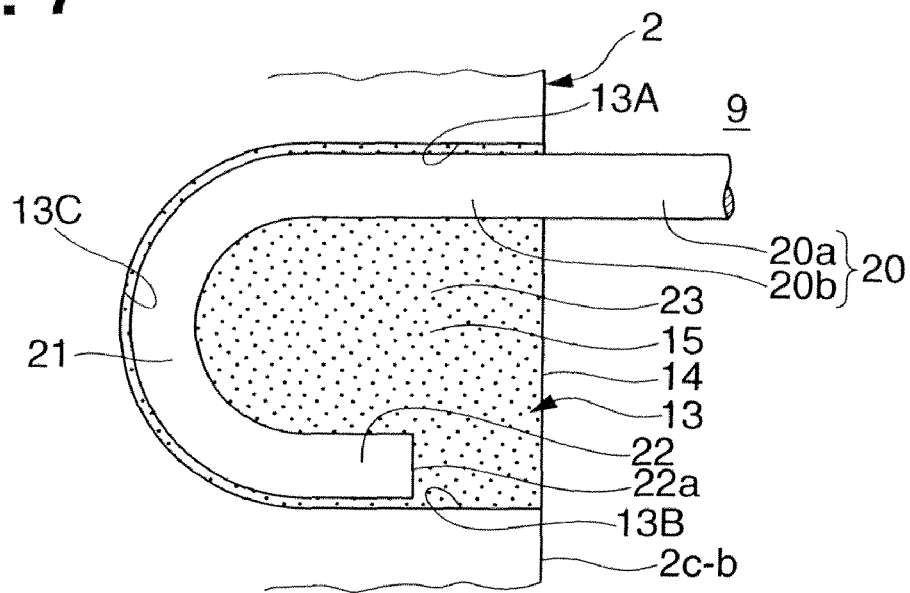
FIG. 7 is a sectional view showing an embodiment of the lens holding structure.

FIG. 7 shows an example in which a recessed portion 13 is formed in a spectacle lens 2 to have a semielliptical shape with a semicircularly curved bottom portion 13C, two side portions 13A and 13B are formed parallel to each other, and an insertion portion 9A of a lens holding portion 9 is formed in a J shape by bending a thin wire-like member with a diameter as thin as about 0.4 to 1.2 mm. Referring to FIG. 7, reference numerals 13A, 13B, and 13C denote the upper side portion (to be also referred to as the upper wall hereinafter), the lower side portion (to be also referred to as the lower wall hereinafter), and the bottom portion, respectively, of the recessed portion 13; and 14, an opening. The upper wall 13A and lower wall 13B of the recessed portion 13 are parallel to and vertically opposed to each other. The opening 14 is elongated in the circumferential direction of the spectacle lens 2 with a groove width slightly larger than the wire diameter of the insertion portion 9A. The opening length of the recessed portion 13 is set slightly larger than the vertical width of the insertion portion 9A.

The lens holding portion 9 is formed integrally with the lens holding member main body (end piece main body), and includes a linear proximal portion 20, bottom portion side bent portion 21, and extension portion 22. The proximal portion 20 has a portion inserted in the recessed portion 13 along the upper wall 13A of the recessed portion 13. The bottom portion side bent portion 21 is formed continuous with the proximal portion 20, and bent in a semicircular shape so as to match a bottom portion 13C of the recessed portion 13. The extension portion 22 is formed continuous with the bottom portion side bent portion 21. The proximal portion 20 includes an outer proximal portion 20a positioned outside the recessed portion 13, and an inner proximal portion 20b positioned inside the recessed portion 13.

The inner proximal portion 20b is inserted into the recessed portion 13 along the upper wall 13A of the recessed portion 13, and has a length nearly equal to the upper wall 13A. The bottom portion side bent portion 21 has its distal end face curved in a semicircular shape with nearly the same radius of curvature as the bottom portion 13C. The extension portion 22 forms a turning portion upon extending toward the opening 14 along the lower wall 13B of the recessed portion 13. Also, the extension portion 22 is parallel to the proximal portion 20, has a length shorter than the inner proximal portion 20b, and has a distal end 22a on the inner side with respect to the opening 14 of the recessed portion 13, thereby making the insertion portion 9A have a J shape as a whole. Also, a space 23 surrounded by the portion (insertion portion 9A) inserted in the recessed portion 13 in the lens holding portion 9, i.e., by the inner proximal portion 20b, bottom portion side bent portion 21, and extension portion 22 forms a space open to the opening 14 of the recessed portion 13. An adhesive 15 is filled into the gap (including the space 23) between the insertion portion 9A and the recessed portion 13, and solidified.

Figure 8:
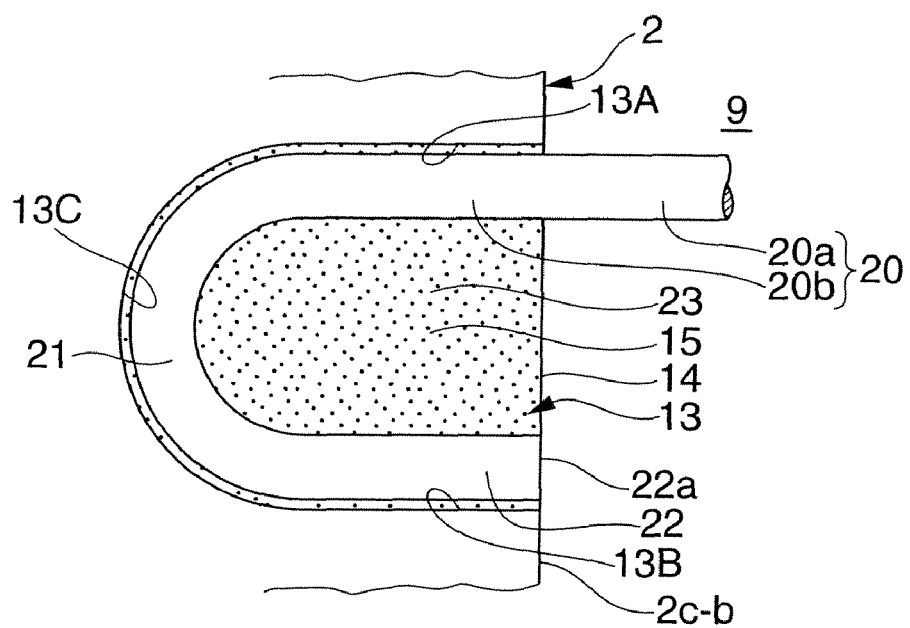
FIG. 8 is a sectional view showing another embodiment of the lens holding structure.

An embodiment shown in FIG. 8 is different from that shown in FIG. 7 only in that in the former an extension portion 22 is formed longer than the latter to position a distal end 22a in an opening 14 of a recessed portion 13, thereby forming a U-shaped portion from an inner proximal portion 20b of a lens holding portion 9 to the distal end 22a of the extension portion 22, and other arrangements in the former are exactly the same as in the latter. Hence, the same reference numerals denote the same constituent members and portions, and a description thereof will not be given as needed. In this embodiment as well, a space 23 surrounded by a portion (insertion portion 9A) inserted in the recessed portion 13 in the lens holding portion 9 forms a space open to the opening 14 of the recessed portion 13.

Figure 9:
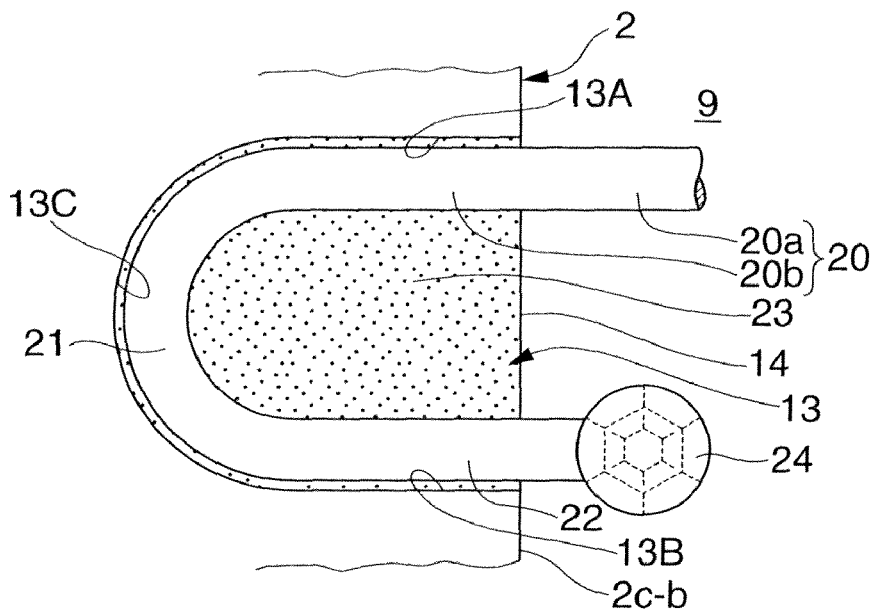
FIG. 9 is a sectional view showing still another embodiment of the lens holding structure.

A lens holding portion 9 shown in FIG. 9 is different from the lens holding portions 9 shown in FIGS. 7 and 8 only in that in the former a distal end 22a of an extension portion 22 of the lens holding portion 9 projects outside an opening 14 of a recessed portion 13, and the projection end is fitted with an ornament 24, and other arrangements in the former are exactly the same as in the latter.

The ornament 24 includes, e.g., a jewel, a precious metal, a leather, ceramics, a synthetic resin, a combination thereof, an ornament panel adorned with, e.g., a trademark, a numeric character, or a decorative figure or pattern, a string, or a chain, and its material, shape, etc. are not limited to these examples.

Figure 10:
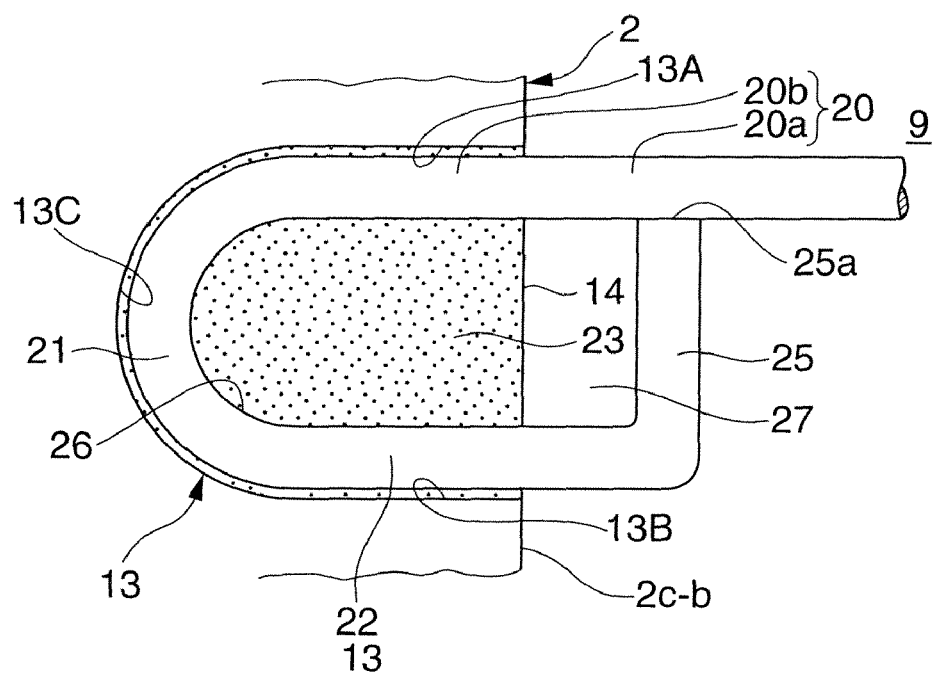
FIG. 10 is a sectional view showing still another embodiment of the lens holding structure.

FIG. 10 shows a lens holding structure obtained by forming a bent portion 25 by making an extension portion 22 of a lens holding portion 9 project outside an opening 14 of a recessed portion 13 and bending the distal end of the extension portion 22 at a right angle toward an upper position, and connecting a distal end 25a of the bent portion 25 to the lower surface of an outer proximal portion 20a by, e.g., brazing. Therefore, an insertion portion 9A forms a space 23 using an inner proximal portion 20b, a bottom portion side bent portion 21, and part of the extension portion 22. In this case, the bent portion 25 is spaced apart from an outer edge surface 2c-b of a spectacle lens 2 to form an appropriate gap 27 between itself and the opening 14 of the recessed portion 13, so the space 23 is open to the outside of the spectacle lens 2, like the spaces 23 shown in FIGS. 7 to 9. An appropriate ornament can be attached to the bent portion 25, as in the embodiment shown in FIG. 9.

Figure 11:
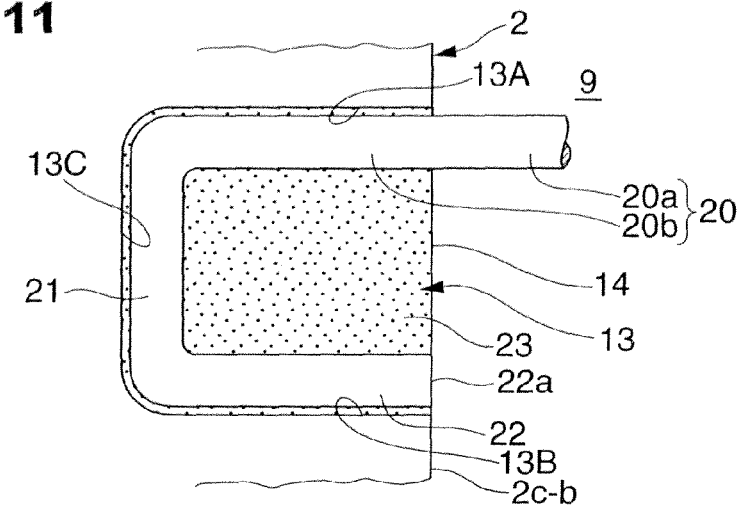
FIG. 11 is a sectional view showing still another embodiment of the lens holding structure.

An embodiment shown in FIG. 11 is different from the embodiments shown in FIGS. 7, 8, 9, and 10 in that in the former a recessed portion 13 is formed in a spectacle lens 2 to have a rectangular shape, a portion (insertion portion 9A) inserted in the recessed portion 13 in a lens holding portion 9, i.e., an inner proximal portion 20b, a bottom portion side bent portion 21, and an extension portion 22 are formed in a ⊐shape, and a distal end 22a of the extension portion 22 is positioned at the lower end of an opening 14 of the recessed portion 13. The inner proximal portion 20b of the proximal portion 20 is inserted in the recessed portion 13 along an upper wall 13A of the recessed portion 13. The bottom portion side bent portion 21 is bent downward along a bottom portion 13C of the recessed portion 13.

The extension portion 22 extends toward the opening 14 along a lower wall 13B of the recessed portion 13, and has the distal end 22a positioned at the lower end of the opening 14.

Figure 12:
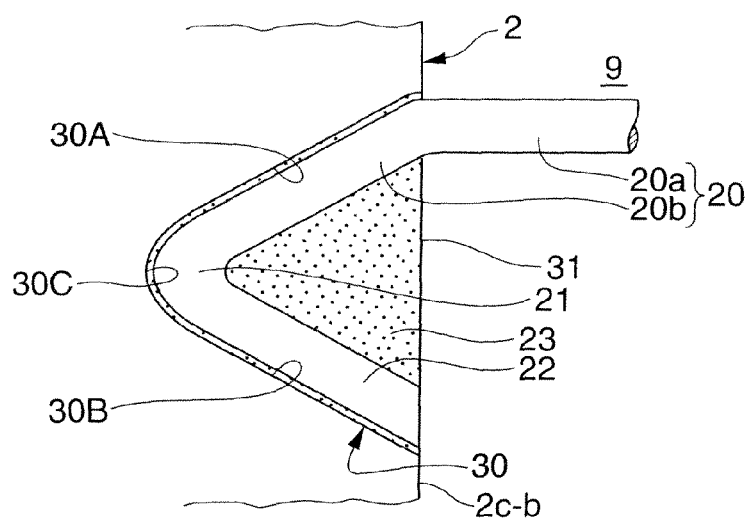
FIG. 12 is a sectional view showing still another embodiment of the lens holding structure.

FIG. 12 shows a lens holding structure obtained by forming a recessed portion 30 in a spectacle lens 2 to have an isosceles triangle shape to form an upper wall 30A and a lower wall 30B as surfaces inclined in opposite directions at the same angle so that a bottom portion 30C becomes the intersecting portion between the upper wall 30A and the lower wall 30B.

A lens holding portion 9 includes a proximal portion 20, bottom portion side bent portion 21, and extension portion 22. The proximal portion 20 includes a linear, outer proximal portion 20a, and an inner proximal portion 20b inclined downward along the upper wall 30A. The extension portion 22 is inclined downward along the lower wall 30B, and has a distal end 22a positioned at the lower end of an opening 31 of the recessed portion 30. Therefore, a portion (insertion portion 9A) inserted in the recessed portion 30 in the lens holding portion 9 is formed by being bent in a V shape that matches the shape of the inner edge surface of the recessed portion 30. The bottom portion side bent portion 21 is a portion in which the bottom portion side bent portion 21 and the extension portion 22 are connected to each other.

Figure 13:
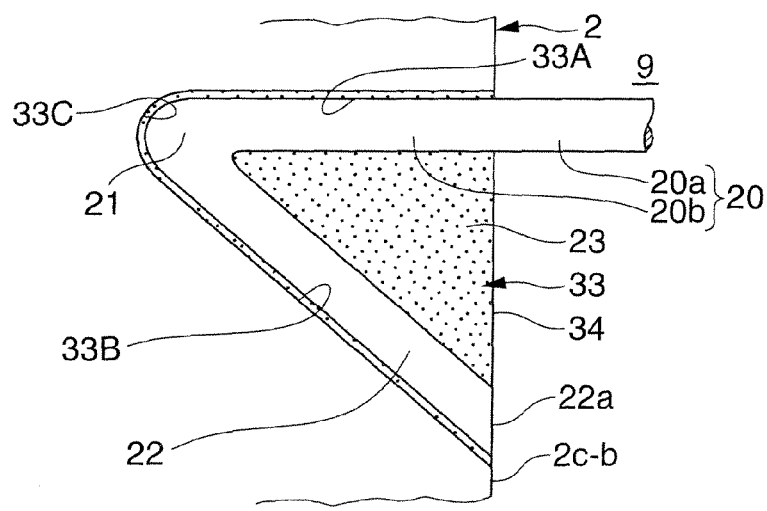
FIG. 13 is a sectional view showing still another embodiment of the lens holding structure.

An embodiment shown in FIG. 13 is different from that shown in FIG. 12 in that in the former a recessed portion 33 is formed in a spectacle lens 2 to have a right triangle shape, thereby including a horizontal upper wall 33A, a lower wall 33B inclined obliquely upward, and a bottom portion 33C as the intersecting portion between the upper wall 33A and the lower wall 33B, and a portion (insertion portion 9A) inserted in the recessed portion 33 in a lens holding portion 9 is formed by being bent in a " Ⱶ "shape so as to match the inner edge surface of the recessed portion 33. Therefore, the lens holding portion 9 includes a linear proximal portion 20, a bottom portion side bent portion 21, and an extension portion 22 bent obliquely downward along the lower wall 33B from the bottom portion side bent portion 21. A distal end 22a of the extension portion 22 is positioned at the lower end of an opening 34 of the recessed portion 33.

The embodiments shown in FIGS. 7 to 13 are common in that the extension portion 22 folded back once toward the opening of the recessed portion 13, 30, or 33 extends from the bottom portion side bent portion 21 of the insertion portion 9A, in that the space 23 surrounded by the insertion portion 9A is open to the outside of the opening of the recessed portion 13, 30, or 33, and in that the inner proximal portion 20b of the proximal portion 20 is inserted in the recessed portion 13, 30, or 33 along the upper wall 13A, 30A, or 33A of the recessed portion 13, 30, or 33. However, the present invention is not limited to those, and inverted shapes may be used. In this case, in the embodiment shown in FIG. 13, since the recessed portion 33 has a vertically asymmetrical shape, an inverted recessed portion need only be formed so as to match the shape of the insertion portion 9A. Also, since the inner proximal portion, bottom portion side bent portion, and extension portion of the insertion portion 9A are continuously in proximity to the bottom portion, upper side portion, and lower side portion of the recessed portion 13, 30, or 33, a thin adhesive layer can be continuously formed on the inner edge surface, thereby strengthening the adhesion between the insertion portion 9A and the inner surface of the recessed portion.

Figure 14:
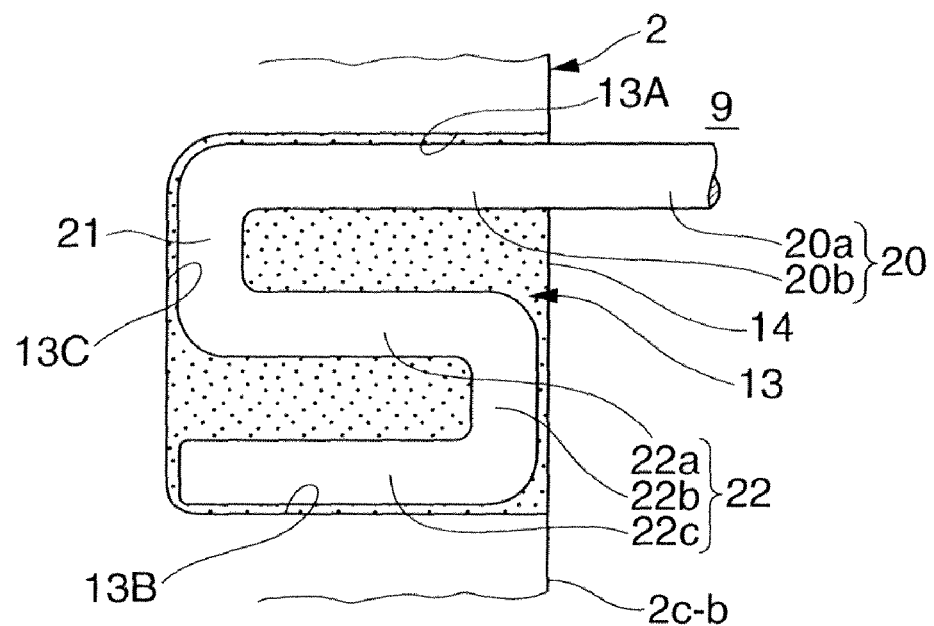
FIG. 14 is a sectional view showing still another embodiment of the lens holding structure.

FIG. 14 shows a lens holding structure obtained by forming a recessed portion 13 in a spectacle lens 2 to have a rectangular shape, and forming a portion (insertion portion 9A) inserted in the recessed portion 13 in a lens holding portion 9 to have an angled S shape. Therefore, the lens holding portion 9 includes a linear proximal portion 20, bottom portion side bent portion 21, and extension portion 22. The proximal portion 20 includes an outer proximal portion 20a and inner proximal portion 20b. The bottom portion side bent portion 21 is bent downward along a bottom portion 13C of the recessed portion 13 from the distal end of the inner proximal portion 20b. The extension portion 22 is bent in a ⊐shape from the lower end of the bottom portion side bent portion 21. The bottom portion side bent portion 21 has a length almost half the bottom portion 13C. The extension portion 22 includes a bent portion 22a, recessed portion widthwise bent portion 22b, and bent portion 22c. The distal end 22a is bent toward an opening 14 of the recessed portion 13. The bent portion 22b is bent downward from the front end of the bent portion 22a. The bent portion 22c is bent in the depth direction of the recessed portion 13 from the lower end of the bent portion 22b. A space surrounded by the inner proximal portion 20b, bottom portion side bent portion 21, and distal end 22a forms a space open to the opening 14 of the recessed portion 13. The longitudinal bent portion 22b is positioned in the opening 14 of the recessed portion 13.

Figure 15:
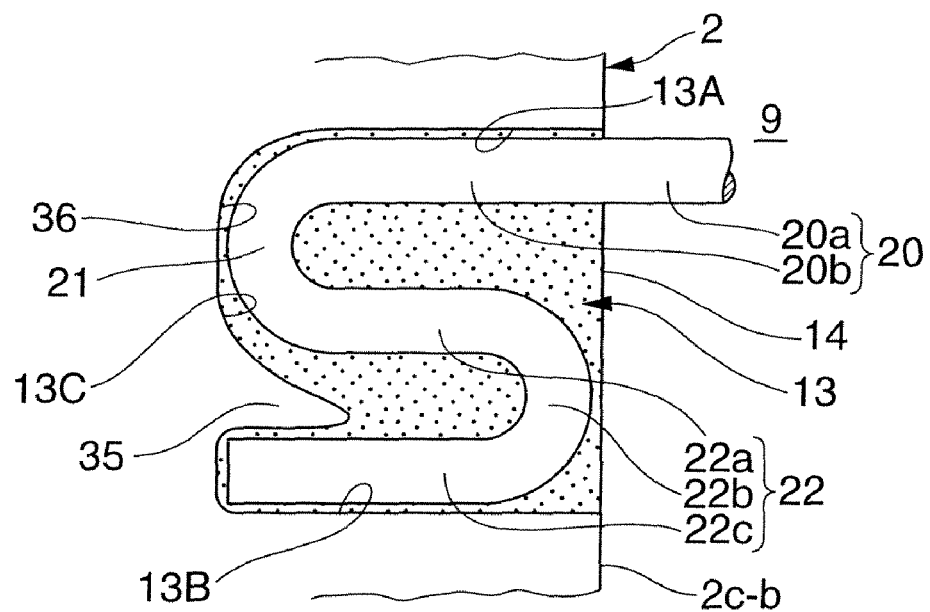
FIG. 15 is a sectional view showing still another embodiment of the lens holding structure.

FIG. 15 shows a lens holding structure obtained by forming a recessed portion 13 in a spectacle lens 2 to have an irregular rectangular shape with a projecting portion 35 in a bottom portion 13C, and forming a portion (insertion portion 9A) inserted in the recessed portion 13 in the lens holding portion 9 to have an S shape. The upper corner portion of the bottom portion 13C of the recessed portion 13 is formed to have a curved surface 36 in a quarter circle. The projecting portion 35 has an upper surface inclined downward, and a lower surface with a horizontal wedge shape (triangular shape).

The insertion portion 9A shown in FIG. 15 is different from the S-shaped insertion portion 9A shown in FIG. 14 in that in the former two flexure portions are bent in semicircles. Therefore, the lens holding portion 9 includes a linear proximal portion 20, bottom portion side bent portion 21, and extension portion 22. The proximal portion 20 includes an outer proximal portion 20a and inner proximal portion 20b. The bottom portion side bent portion 21 is bent in a semicircle along the curved surface 36 of the bottom portion 13C of the recessed portion 13. The extension portion 22 is bent in a U shape. The extension portion 22 includes a bent portion 22a, semicircular bent portion 22b, and bent portion 22c. The bent portion 22a is folded back toward an opening 14 of the recessed portion 13. The bent portion 22b is bent downward from the front end of the bent portion 22a. The bent portion 22c is folded back in the depth direction of the recessed portion 13 from the lower end of the bent portion 22b. The distal end of the bent portion 22c is positioned immediately below the projecting portion 35. In the above-mentioned examples shown in FIGS. 14 and 15, it is also possible to make the bent portions 22a and 22c of the extension portion 22 project from the opening 14 to position the bent portion 22b outside the recessed portion 13.

Figure 16:
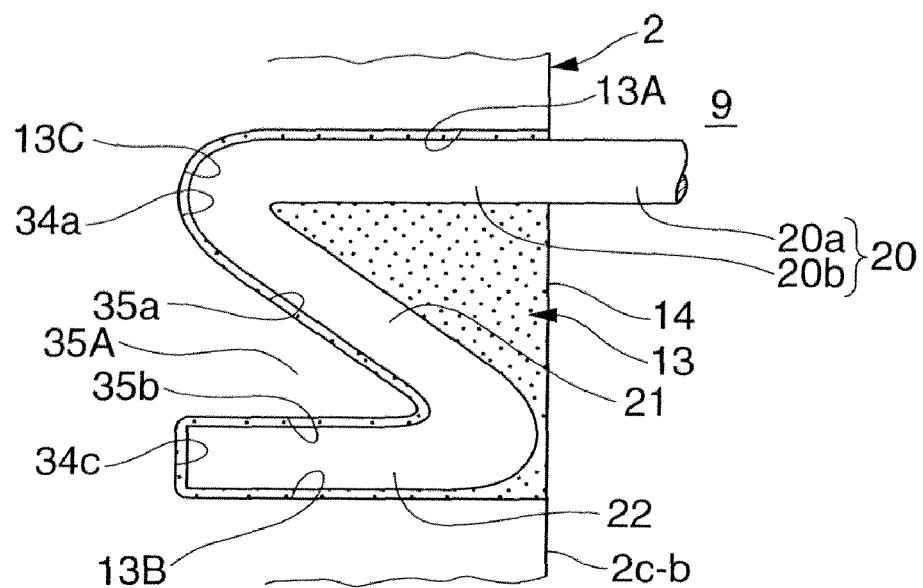
FIG. 16 is a sectional view showing still another embodiment of the lens holding structure.

FIG. 16 is different from FIG. 15 in that a projecting portion 35A which projects from a bottom portion 13C of a recessed portion 13 in a spectacle lens 2 shown in the former is formed longer and larger than the projecting portion 35 shown in the latter. The projecting portion 35A has an upper surface 35a which forms a surface inclined downward at an appropriate angle, and a bottom surface 35b which forms a surface parallel to an upper wall 13A and lower wall 13B of the recessed portion 13. The bottom portion 13C includes the upper surface 35a of the projecting portion 35, a concavely curved portion 34a which connects the upper wall 13A and the upper surface 35a of the projecting portion 35A to each other, the bottom surface 35b of the projecting portion 35A, and a vertical surface 34c which connects the bottom surface 35b and the lower wall 13B to each other.

In a lens holding portion 9 shown in FIG. 16, a portion (insertion portion 9A) inserted in the recessed portion 13 is formed by being bent in an S shape, as in the insertion portions 9A shown in FIGS. 14 and 15. However, the shape of the insertion portion 9A shown in FIG. 16 is different from that of the insertion portions 9A shown in FIGS. 14 and 15 in that in the former two flexure portions are bent at angles of about 45°, and a bottom portion side bent portion 21 and extension portion 22 are bent in a " $\swarrow$ "shape. That is, the bottom portion side bent portion 21 includes a portion inclined downward along the upper surface 35a of the projecting portion 35 from the distal end of the inner proximal portion 20b, and the extension portion is folded back in the depth direction of the recessed portion 13 from the distal end of the projecting portion 35, and therefore sandwiched between the lower wall 13B and the bottom surface 35b of the projecting portion 35A.

Figure 17:
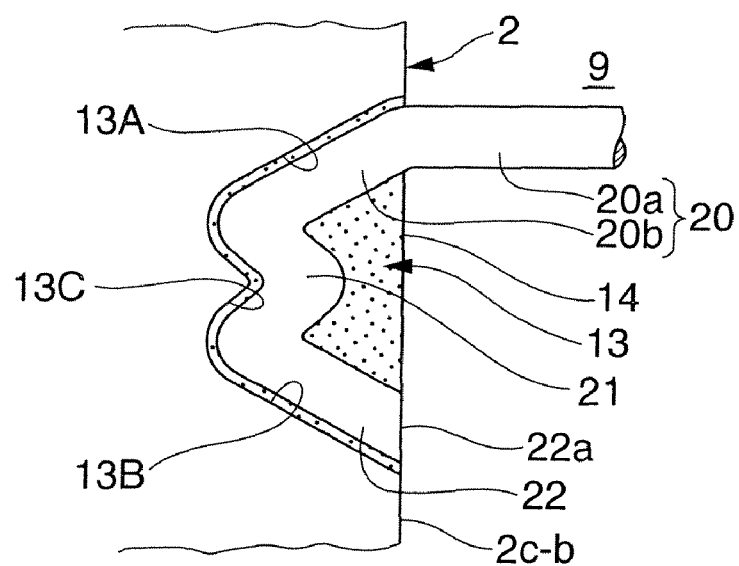
FIG. 17 is a sectional view showing still another embodiment of the lens holding structure.

FIG. 17 shows a lens holding structure obtained by forming a recessed portion 13 to have a W shape, and forming a portion (insertion portion 9A) inserted in the recessed portion 13 in a lens holding portion 9 by bending it in a W shape along the inner edge surface of the recessed portion 13. An upper wall 13A of the recessed portion 13 is formed as a surface inclined downward. On the other hand, a lower wall 13B of the recessed portion 13 is formed as a surface inclined in the direction opposite to the inclination direction of the upper wall 13A at the same angle as the upper wall 13A. A bottom portion 13C of the recessed portion 13 is formed in a V shape, thereby including two bent portions inclined in opposite directions.

The lens holding portion 9 includes a proximal portion 20, bottom portion side bent portion 21, and extension portion 22. The proximal portion 20 includes an outer proximal portion 20a and inner proximal portion 20b. The outer proximal portion 20a is perpendicular to an edge surface 2c-b of a spectacle lens 2. The inner proximal portion 20b is inclined downward along the upper wall 13A of the recessed portion 13. The bottom portion side bent portion 21 is formed in a V shape by being bent along the bottom portion 13C of the recessed portion 13. The extension portion 22 is inclined downward along the lower wall 13B of the recessed portion 13, and has a distal end 22a positioned at the lower end of an opening 14 of the recessed portion 13.

Figure 18:
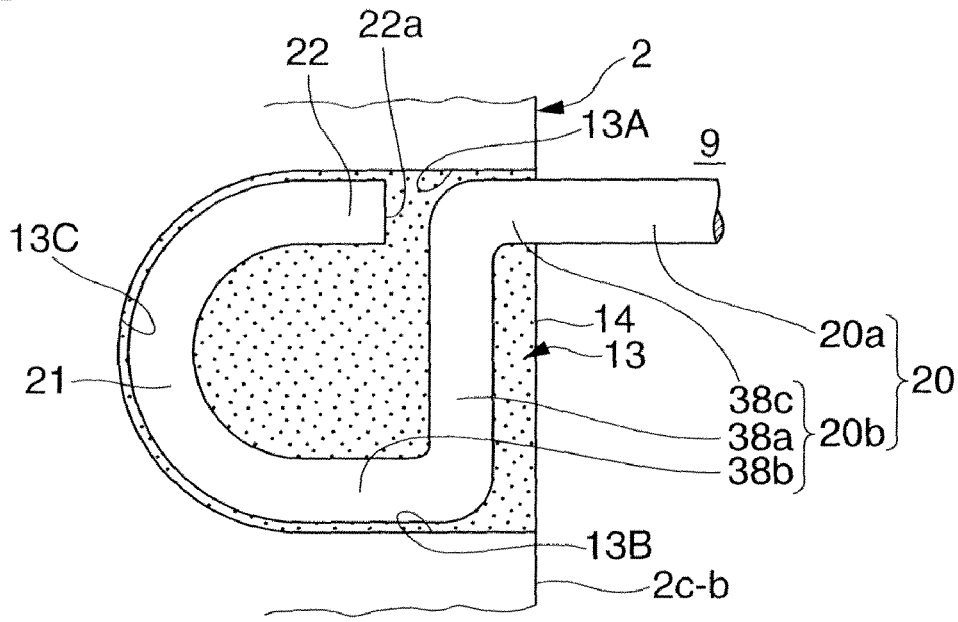
FIG. 18 is a sectional view showing still another embodiment of the lens holding structure.

FIG. 18 shows a lens holding structure obtained by forming a recessed portion 13 to have a semielliptical shape, and forming a lens holding portion 9 to include a proximal portion 20, bottom portion side bent portion 21, and extension portion 22. The proximal portion 20 includes an outer proximal portion 20a perpendicular to an edge surface 2c-b of a spectacle lens 2, and an inner proximal portion 20b inserted in the recessed portion 13. The inner proximal portion 20b includes an introduction portion 38c, recessed portion widthwise bent portion 38a, and depth direction bent portion 38b. The introduction portion 38c is inserted in the recessed portion 13 along an upper wall 13A of the recessed portion 13. The recessed portion widthwise bent portion 38a is bent in the downward direction of the recessed portion 13 from the inner end of the introduction portion 38c. The depth direction bent portion 38b is bent in the depth direction of the recessed portion 13 along a lower wall 13B of the recessed portion 13 from the lower end of the recessed portion widthwise bent portion 38a. The outer proximal portion 20a and introduction portion 38c are formed in linear shapes. The introduction portion 38c has a length about ⅓ that of the upper wall 13A. The bottom portion side bent portion 21 is curved in a semicircle along a bottom portion 13C of the recessed portion 13, and includes the extension portion 22 extending from its upper end. The extension portion 22 is formed in a linear shape toward an opening 14 of the recessed portion 13, and has a distal end 22a opposed to the distal end face of the introduction portion 38c. That is, in an insertion portion 9A, the extension portion 22 is positioned on the upper side in the same way as in the proximal portion 20.

Figure 19:
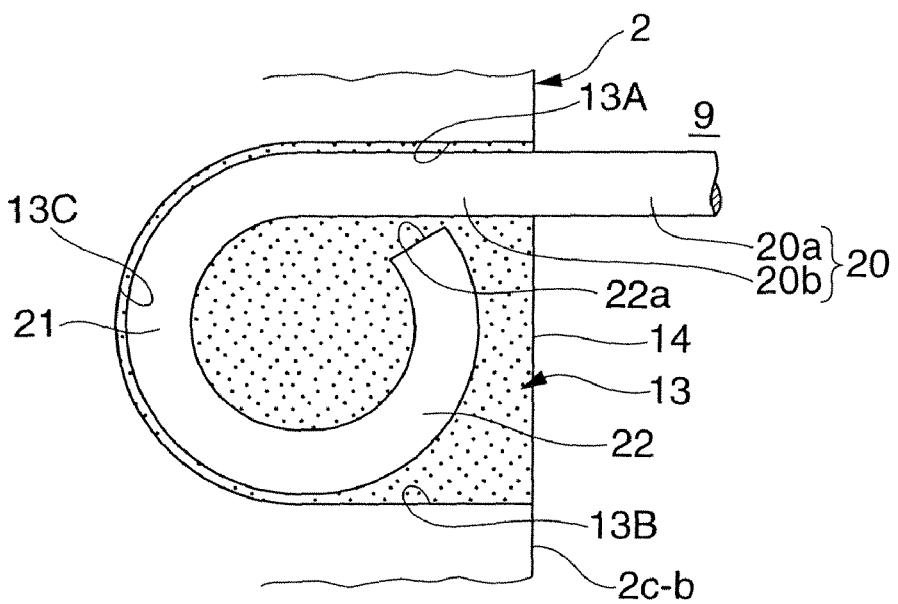
FIG. 19 is a sectional view showing still another embodiment of the lens holding structure.

FIG. 19 shows a lens holding structure obtained by forming a recessed portion 13 to have a semielliptical shape, and forming an insertion portion 9A in a numeric character "9". Therefore, a lens holding portion 9 includes a linear proximal portion 20, a semicircular bottom portion side bent portion 21, and a semicircular extension portion 22 formed by being bent upward so as to form an arc which is continuous with the bottom portion side bent portion 21 and has almost the same radius of curvature as the bottom portion side bent portion 21 from the lower end of the bottom portion side bent portion 21. A distal end 22a of the extension portion 22 is positioned immediately below the inner proximal portion 20b in proximity to it.

Figure 20:
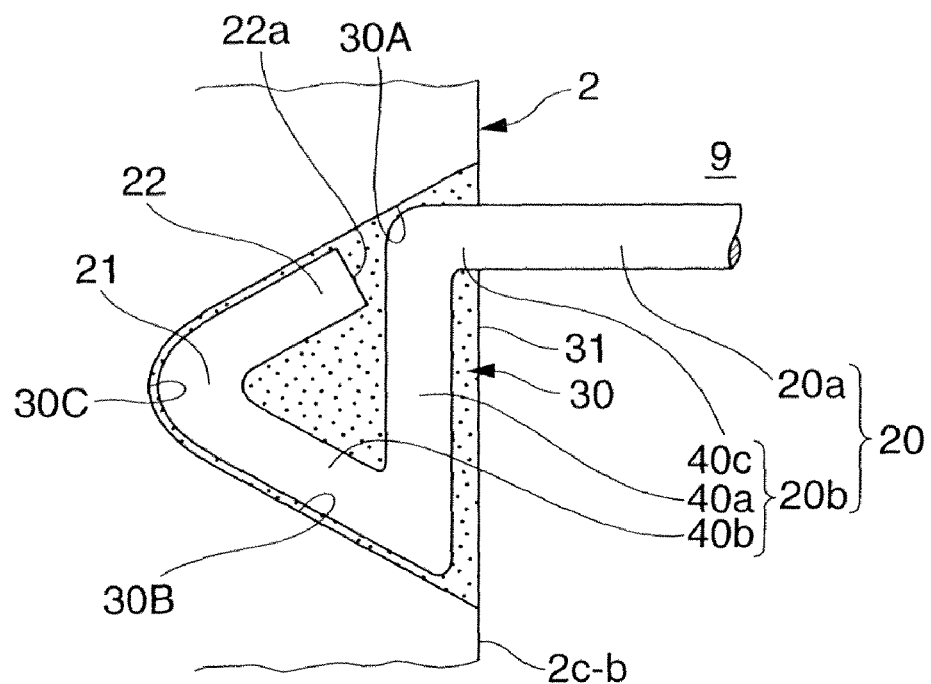
FIG. 20 is a sectional view showing still another embodiment of the lens holding structure.

FIG. 20 shows a lens holding structure obtained by forming a recessed portion 30 in an isosceles triangle, and forming a portion (insertion portion) inserted in the recessed portion 30 in a lens holding portion 9 by bending it in a triangle so as to match the inner wall of the recessed portion 30. Therefore, the recessed portion 30 includes an inclined upper wall 30A and lower wall 30B, and a bottom portion 30C, like the recessed portion 30 shown in FIG. 12. The bottom portion 30C is the intersecting portion between the upper wall 30A and the lower wall 30B.

The lens holding portion 9 includes a proximal portion 20, bottom portion side bent portion 21, and extension portion 22. The proximal portion 20 includes an outer proximal portion 20a perpendicular to an edge surface 2c-b of a spectacle lens 2, and an inner proximal portion 20b inserted in the recessed portion 30. The inner proximal portion 20b includes an introduction portion 40c, recessed portion widthwise bent portion 40a, and depth direction bent portion 40b. The introduction portion 40c is short and inserted in the recessed portion 30 from the upper end opening side of the recessed portion 30. The widthwise bent portion 40a is bent downward from the inner end of the introduction portion 40c. The bent portion 40b is bent obliquely upward along the lower wall 30B from the lower end of the widthwise bent portion 40a, and connected to the bottom portion side bent portion 21. The widthwise bent portion 40a and depth direction bent portion 40b are formed in a " $\swarrow$ "shape. The bottom portion side bent portion 21 is formed along the bottom portion 30C of the recessed portion 30. The extension portion 22 is inclined obliquely upward along the upper wall 30A, and has its distal end opposed to the inner end of the inner proximal portion 20b in proximity to it.

Figure 21:
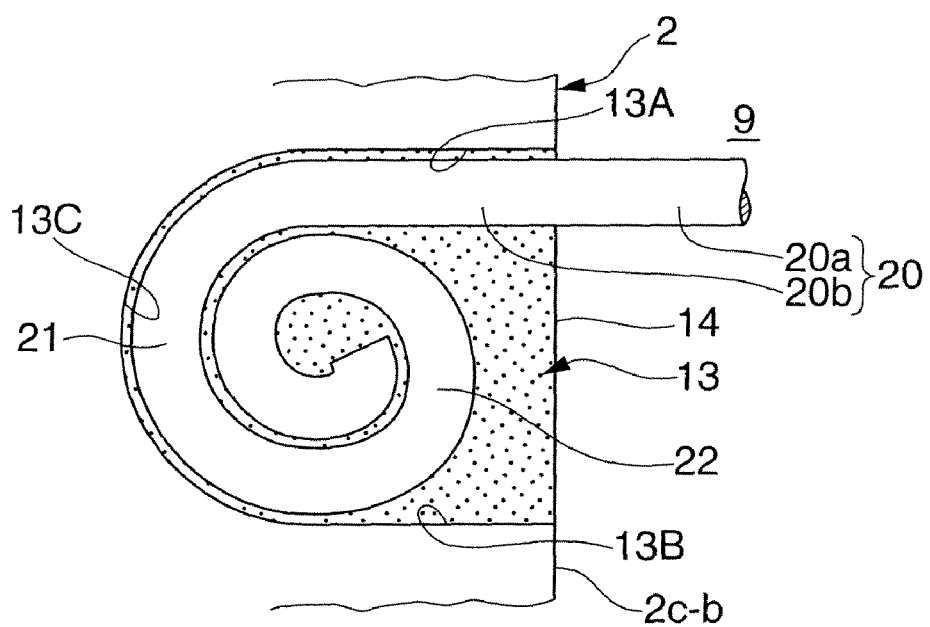
FIG. 21 is a sectional view showing still another embodiment of the lens holding structure.

FIG. 21 shows a lens holding structure obtained by forming a recessed portion 13 to have a semielliptical shape, and forming a portion (insertion portion 9A) inserted in the recessed portion 13 in a lens holding portion 9 to have a spiral shape. Therefore, the lens holding portion 9 includes a linear proximal portion 20, bottom portion side bent portion 21, and extension portion 22. The bottom portion side bent portion 21 is curved in a semicircle along a bottom portion 13C of the recessed portion 13. The extension portion 22 is bent toward the center of the recessed portion 13 so as to form a spiral continuous from the lower end of the bottom portion side bent portion 21.

Figure 22:
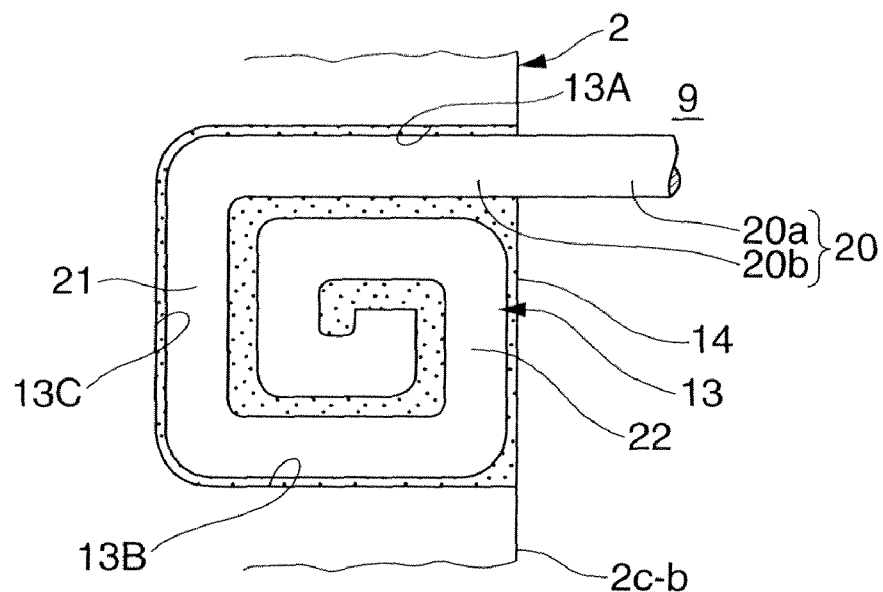
FIG. 22 is a sectional view showing still another embodiment of the lens holding structure.
Figure 23:
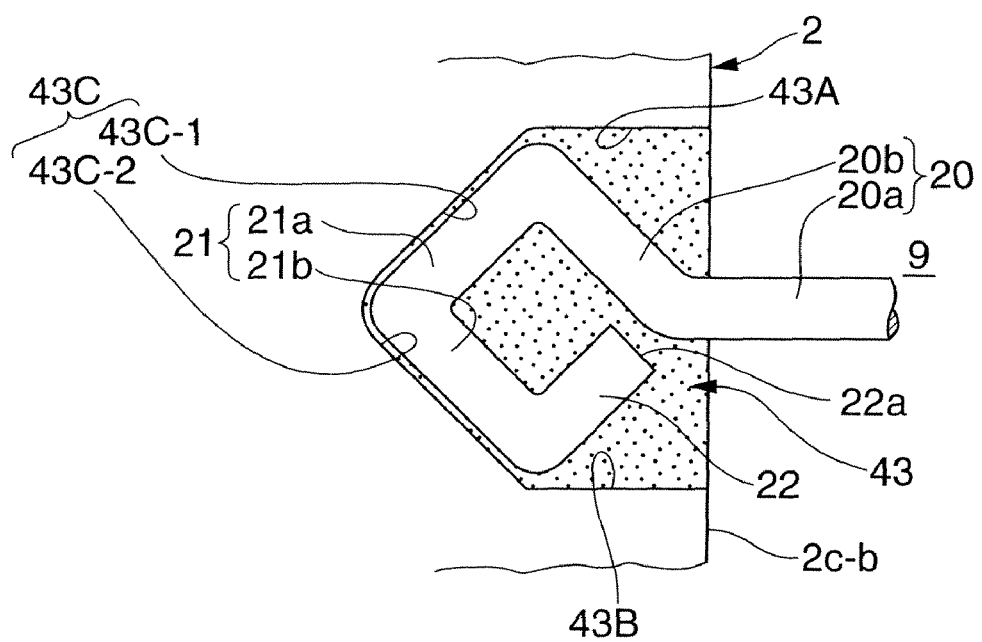
FIG. 23 is a sectional view showing still another embodiment of the lens holding structure.

An embodiment shown in FIG. 22 is different from that shown in FIG. 21 in that in the former a recessed portion 13 is formed in a rectangle, and a portion (insertion portion 9A) inserted in the recessed portion 13 in a lens holding portion 9 is formed in an angled spiral.

FIG. 23 shows a lens holding structure obtained by forming a recessed portion 43 in a pentagon, and forming a portion (insertion portion 9A) inserted in the recessed portion 43 in a lens holding portion 9 to have a quadrangular shape inclined at nearly 45° with respect to an edge surface 2*c*-*b* of a spectacle lens 2.

The recessed portion 43 includes an upper wall 43A and lower wall 43B that are parallel to and vertically opposed to each other, and a bottom portion 43C which connects the back ends of the walls 43A and 43B to each other. The bottom portion 43C includes an upper bottom portion 43C-1 and lower bottom portion 43C-2 which intersect with each other at an angle of 90°. Therefore, the upper wall 43A and the upper bottom portion 43C-1, and the lower wall 43B and the lower bottom portion 43C-2 intersect with each other at angles of 135°, respectively.

The lens holding portion 9 includes a proximal portion 20, bottom portion side bent portion 21, and extension portion 22. The proximal portion 20 includes an outer proximal portion 20*a* and inner proximal portion 20*b*. The outer proximal portion 20*a* is at the center of the opening of the recessed portion 43. The inner proximal portion 20*b* is inserted in the recessed portion 43. The inner proximal portion 20*b* is bent obliquely upward at an angle of 45°. The bottom portion side bent portion 21 is formed by being bent in a V shape along the bottom portion 43C of the recessed portion 43, thereby including an upper bent portion 21*a* inclined obliquely downward along the upper bottom portion 43C-1, and a lower bent portion 21*b* inclined obliquely downward along the lower bottom portion 43C-2. The extension portion 22 is formed by being bent obliquely upward at an angle of 45° from the lower end of the lower bent portion 21*b*, and has a distal end 22*a* positioned near the lower end of the inner proximal portion 20*b*.

Figure 24:
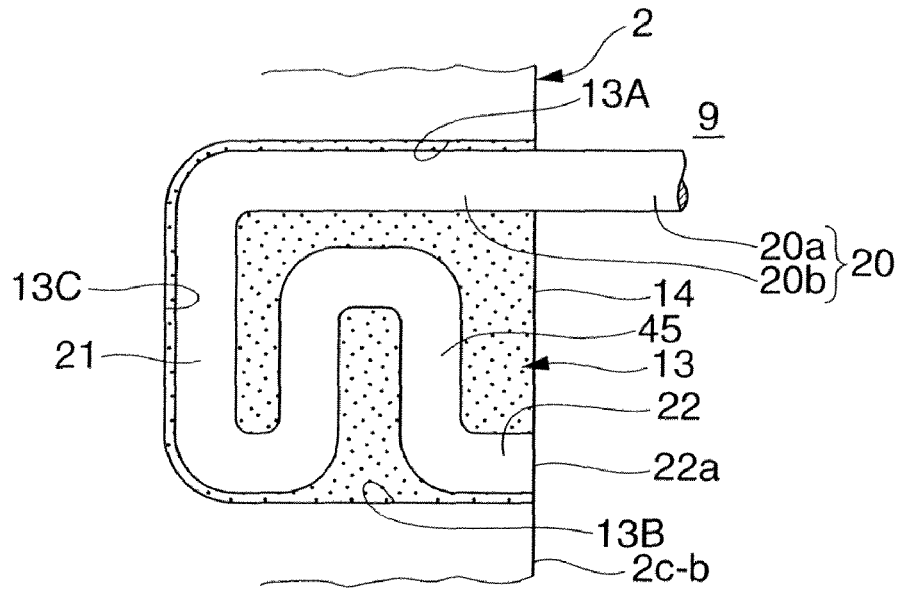
FIG. 24 is a sectional view showing still another embodiment of the lens holding structure.

FIG. 24 shows a lens holding structure obtained by forming a recessed portion 13 to have a rectangular shape, and forming a lens holding portion 9 to include a proximal portion 20, bottom portion side bent portion 21, and extension portion 22. The proximal portion 20 includes a linearly formed, outer proximal portion 20*a*, and an inner proximal portion 20*b*. The inner proximal portion 20*b* is inserted in the recessed portion 13 along an upper wall 13A of the recessed portion 13. The bottom portion side bent portion 21 is bent downward along a bottom portion 13C of the recessed portion 13 from the distal end of the inner proximal portion 20*b*. The extension portion 22 is formed by being bent toward an opening 14 along a lower wall 13B of the recessed portion 13 from the lower end of the bottom portion side bent portion 21, has a distal end 22*a* positioned at the lower end of the opening 14 of the recessed portion 13, and includes a bent portion 45 which is formed in its middle portion and has a ⊐shape open downward.

Figure 25:
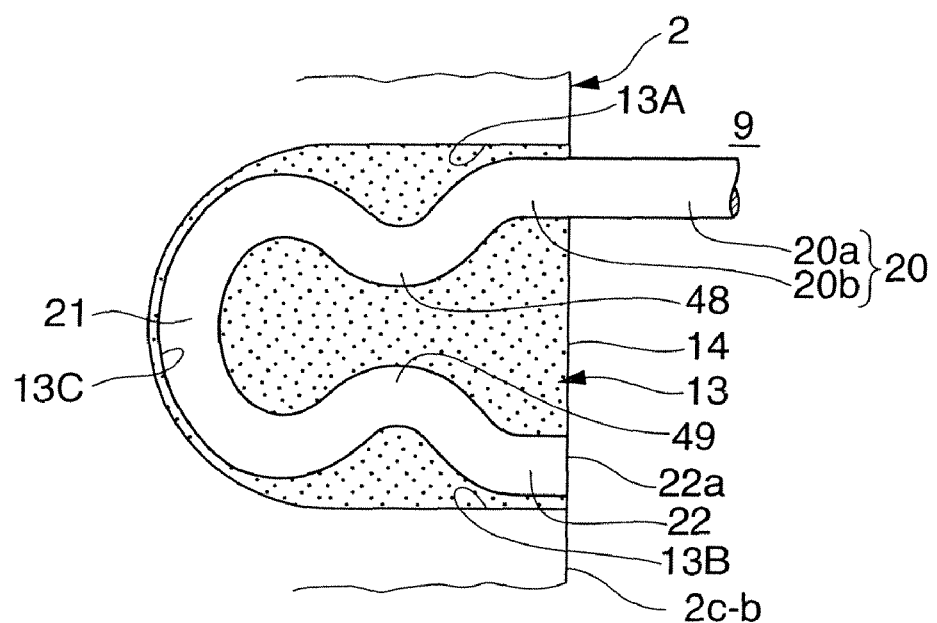
FIG. 25 is a sectional view showing still another embodiment of the lens holding structure.

FIG. 25 shows a lens holding structure obtained by forming a recessed portion 13 to have a semielliptical shape, and forming a portion (insertion portion 9A) inserted in the recessed portion 13 in a lens holding portion 9 to have a pear shape or a shape in which a numeric character "8" is open at the lower position. Therefore, the lens holding portion 9 includes a proximal portion 20, bottom portion side bent portion 21, and extension portion 22. The proximal portion 20 includes a linear outer proximal portion 20*a* positioned outside the recessed portion 13, and an inner proximal portion 20*b* positioned inside the recessed portion 13. Also, a bent portion 48 convexly curved downward is formed at the center of the inner proximal portion 20*b*. The bottom portion side bent portion 21 is curved in a semicircle along a bottom portion 13C of the recessed portion 13. The extension portion 22 extends along a lower wall 13B of the recessed portion 13 from the lower end of the bottom portion side bent portion 21, and has a distal end 22*a* positioned at the lower end of an opening 14. Moreover, a bent portion 49 convexly curved upward is formed in the middle of the extension portion 22 so as to be opposed to the bent portion 48 of the inner proximal portion 20*b*. Therefore, portions in which the bent portions 48 and 49, respectively, of the insertion portion 9A are formed form constricted portions. The bent portions 48 and 49 are formed in inverted identical shapes.

Figure 26:
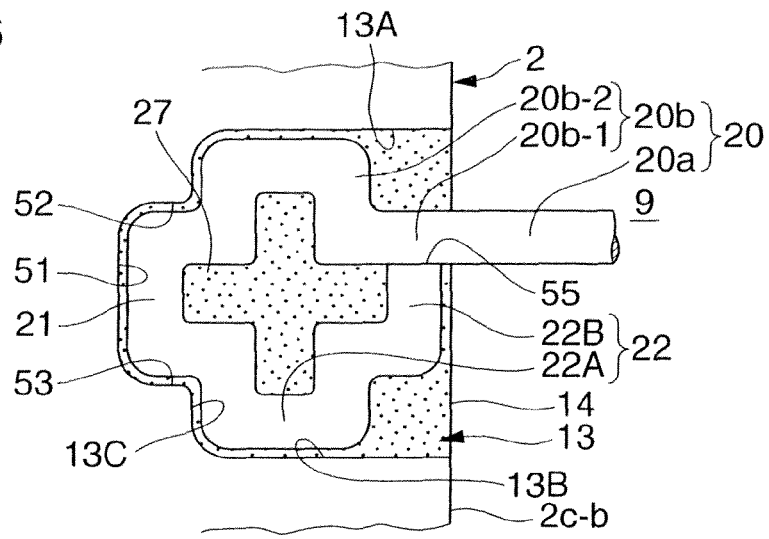
FIG. 26 is a sectional view showing still another embodiment of the lens holding structure.

FIG. 26 shows a lens holding structure obtained by forming a rectangular recessed portion 51 at the center of a bottom portion 13C of a rectangular recessed portion 13, and forming a portion (insertion portion) inserted in the recessed portion 13 in a lens holding portion 9 to have a closed cross frame shape. The recessed portion 13 includes an upper wall 13A and lower wall 13B that are parallel to and vertically opposed to each other, and a bottom portion 13C which connects the back ends of the walls 13A and 13B to each other. The bottom portion 13C has the rectangular recessed portion 51 formed at its center, thereby including stepped portions 52 and 53 at both the upper and lower ends, respectively.

The lens holding portion 9 includes a proximal portion 20, bottom portion side bent portion 21, and extension portion 22. The proximal portion 20 includes a linear, outer proximal portion 20*a*, and an inner proximal portion 20*b*. Also, the inner proximal portion 20*b* includes a linear portion 20*b*-1 continuous with the outer proximal portion 20*a*, and a bent portion 20*b*-2 formed by being bent at the distal end of the linear portion 20*b*-1. The bent portion 20*b*-2 is formed in a ⊐shape open downward, and is positioned above the linear portion 20*b*-1. Therefore, the outer proximal portion 20*a* of the proximal portion 20, and the linear portion 20*b*-1 of the inner proximal portion 20*b* are positioned in the middle portion of an opening 14 of the recessed portion 13 in the height direction.

The bottom portion side bent portion 21 is formed in a ⊐shape open toward the opening 14 so as to match the shape of the bottom portion 13C of the recessed portion 13. The extension portion 22 includes a ⊐-shaped bent portion 22A formed by being bent at the lower end of the bottom portion side bent portion 21, and an L-shaped bent portion 22B. A distal end 55 of the bent portion 22B may be connected to the lower surface of the linear portion 20*b*-1 by, e.g., brazing, or may be brought in proximity to that surface. Therefore, a portion (insertion portion 9A) inserted in the recessed portion 13 in the lens holding portion 9 forms a closed cross-like space 27.

Figure 27:
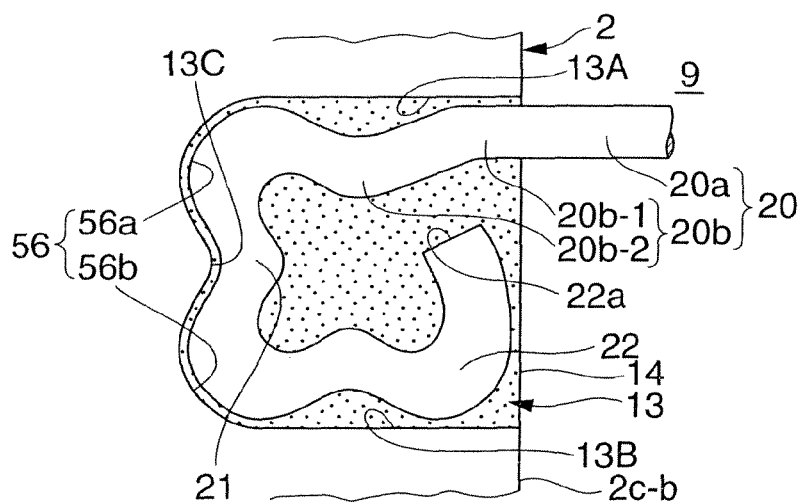
FIG. 27 is a sectional view showing still another embodiment of the lens holding structure.

FIG. 27 shows a lens holding structure obtained by forming a recessed portion 13 to have an irregular rectangular shape with two arcuated recessed portions 56*a* and 56*b* in a bottom portion 13C, and forming a portion (insertion portion 9A) inserted in the recessed portion 13 in a lens holding portion 9 to have a shape approximate to a three-leaf clover using a proximal portion 20, bottom portion side bent portion 21, and extension portion 22. Therefore, the proximal portion 20 includes an outer proximal portion 20a and inner proximal portion 20b. The inner proximal portion 20b includes a linear portion 20b-1, and a bent portion 20b-2 curved convexly downward at the distal end of the linear portion 20b-1. The bottom portion side bent portion 21 is formed by being bent in a curve approximate to a numeric character "3" so as to match the shape of the bottom portion 13C of the recessed portion 13. The extension portion 22 is formed by being bent in a corrugated shape as well, and has a distal end 22a positioned below the bent portion 20b-2 with a spacing from it on the inner side with respect to an opening 14 of the recessed portion 13.

Figure 28:
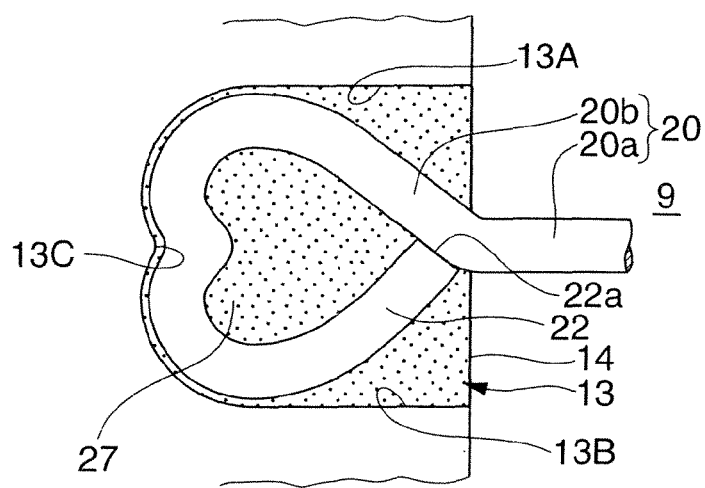
FIG. 28 is a sectional view showing still another embodiment of the lens holding structure.

FIG. 28 shows a lens holding structure obtained by bending a portion (insertion portion 9A) inserted in a recessed portion 13 in a lens holding portion 9 to have a heart shape, and connecting (by, e.g., brazing) a distal end 22a of an extension portion 22 to a proximal portion 20 or bringing the distal end 22a in proximity to the proximal portion 20 to form a closed heart-shaped space 27. Other arrangements in the embodiment shown in FIG. 28 are almost the same as in that shown in FIG. 27.

The lens holding portion 9 includes the proximal portion 20, a bottom portion side bent portion 21, and the extension portion 22. The proximal portion 20 includes a linear, outer proximal portion 20a, and an inner proximal portion 20b curved convexly, obliquely upward. The outer proximal portion 20a is positioned at the center of an opening 14 of the recessed portion 13. The bottom portion side bent portion 21 is bent in a numeric character "3" so as to match the shape of a bottom portion 13C of the recessed portion 13. The extension portion 22 is curved convexly, obliquely upward from the lower end of the bottom portion side bent portion 21, and has a distal end 22a brought in proximity to or bonded by, e.g., brazing to the lower surface of the boundary portion between the outer proximal portion 20a and the inner proximal portion 20b.

Figure 29:
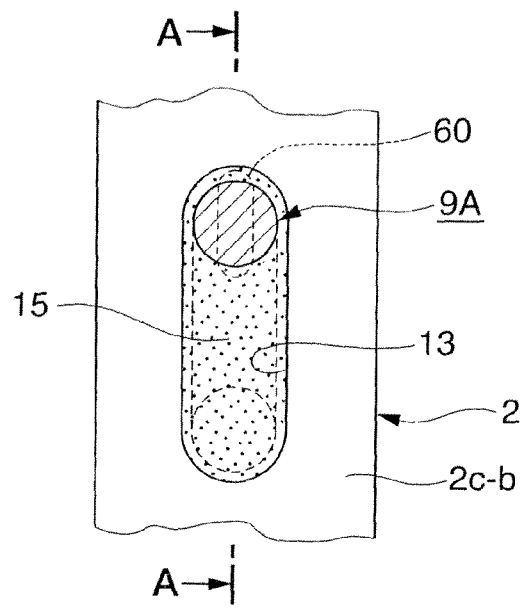
FIG. 29 is a front view showing still another embodiment of the lens holding structure.
Figure 30:
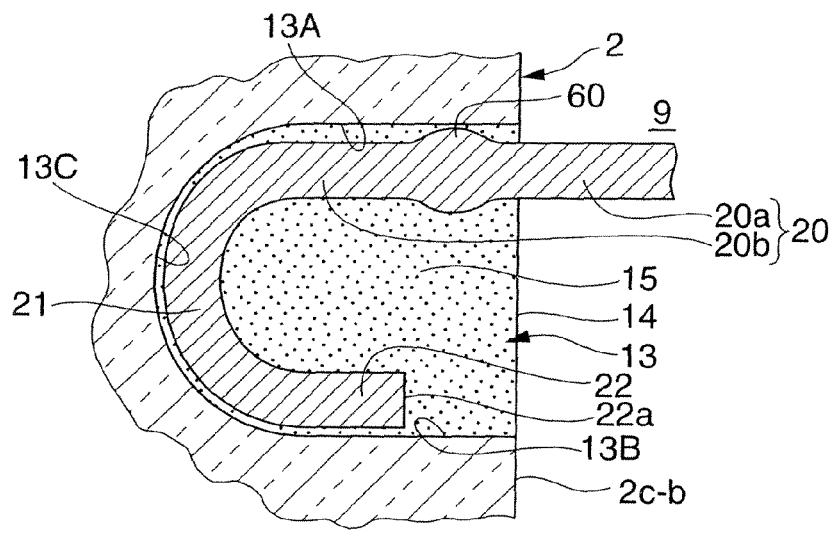
FIG. 30 is a sectional view taken along a line A-A in FIG. 29.

An example of a lens holding structure including a lens holding portion 9 with a twisting preventive function will be described next. FIG. 29 is a front view showing another embodiment of the lens holding structure, and FIG. 30 is a sectional view taken along a line A-A in FIG. 29. This example is the same as that shown in FIG. 7 except that in the former a twisting preventive portion 60 is provided in an inner proximal portion 20b. The twisting preventive portion 60 is formed in a flat shape with a width larger than the diameter of the inner proximal portion 20b and a thickness smaller than this diameter. Thus, rotation of the inner proximal portion 20b can be suppressed when a rotational force acts on an outer proximal portion 20a. The twisting preventive portion 60 preferably flatly stretches parallel to the inner wall surface of the recessed portion. In this case, there is no need to increase the thickness of the recessed portion while the lens holding structure becomes robust against a force acting to stretch the temples to the outside. The twisting preventive portion 60 can have a shape other than the above-mentioned flat shape as long as it has a noncircular cross-section. Also, the twisting preventive portion 60 may be formed at a position across an opening 14 of the recessed portion 13 (i.e., the connection portion between the inner proximal portion 20b and the outer proximal portion 20a).

In this manner, in the present invention, a portion inserted in a recessed portion 13 (or a recessed portion 30, 33, or 43) in a lens holding portion 9 is formed in a shape bent on a single plane so as to match the shape of the inner edge surface of the recessed portion 13 (or the recessed portion 30, 33, or 43), which includes at least a bottom portion 13C, thereby forming the lens holding portion 9 to include a proximal portion 20, bottom portion side bent portion 21, and extension portion 22. With these arrangements, the bottom portion side bent portion 21 of the lens holding portion 9 and the bottom portion 13C of the recessed portion 13 can be bonded to each other using a thin layer of an adhesive 15, and the bonding strength between the lens holding portion 9 and the recessed portion 13 can thus be increased. Also, with these arrangements, a space 23 or 27 is formed to be surrounded by an insertion portion 9A of the lens holding portion 9, on the recessed portion opening side of the bottom portion side bent portion 21 of the lens holding portion 9, and an adhesive which fills the space 23 or 27 solidifies, thereby bonding a pair of inner wall surfaces of the recessed portion. This prevents the bottom portion side bent portion 21 from moving to the recessed portion opening side. Thus, the bonding strength between the lens holding portion and the recessed portion can be increased, and the lens holding portion 9 can be prevented from falling off the recessed portion 13 using the adhesive which bonds the inner wall surfaces to each other even if the adhesive in the vicinity of the lens holding portion peels or breaks. This makes it possible to stably hold the spectacle lens 2 over a long period of time.

Also, with these arrangements, a portion inserted straight in the recessed portion of the proximal portion 20 can absorb twisting of the lens holding portion 9, and breaks of the adhesive layer and lens due to the twisting of the lens holding portion 9 can thus be reduced.

Moreover, with these arrangements, a wire-like member of the lens holding portion 9 can be buried in the recessed portion while being positioned with a spacing between them in its widthwise direction, and the lens holding portion 9 can thus be prevented from rotating.

Because the lens holding portion 9 does not project to optical surfaces 2a and 2b of a spectacle lens 2, an effective field of view wider than two-point or three-piece rimless type spectacles in which pins or screws are screwed into their optical surfaces can be ensured. Hence, the present invention is especially suitable for progressive-power lenses and multifocal lenses used for near vision at high frequencies. Also, the optical surfaces of a spectacle lens having the lens holding portion 9 are easy to wipe, and the design of the spectacle can thus be simplified.

Also, because the recessed portion 13 is formed on an edge surface 2c of the spectacle lens 2, the adhesive 15 is less likely to contaminate the optical surfaces 2a and 2b of the spectacle lens 2 even if it falls outside the recessed portion 13. This makes it easy to attach the spectacle lenses 2 to the nose-side lens holding portions 5 and 9.

Also, if the space 23 surrounded by the portion inserted in the recessed portion 13 in the lens holding portion 9 is open to the outside of the spectacle lens 2, air bubbles generated by the adhesive 15 can be reliably removed in a vacuum degassing process while the lens holding portion 9 is inserted in the recessed portion 13, 30, 33, or 43, and the recessed portion 13, 30, 33, or 43 is filled with the adhesive 15.

Also, when a twisting preventive portion 60 is formed on the lens holding portion 9, or the distal end of the extension portion 22 and the proximal portion 20 are bonded to each other, the spectacle lens 2 can be held while suppressing twisting of the proximal portion 20. In this case, as the twisting preventive portion 60 gets closer to the recessed portion opening side, twisting of the proximal portion 20 can be more effectively suppressed. Also, a twisting suppression effect can be set smaller as the bonding position between the distal end of the extension portion 22 and the proximal portion 20 is closer to the back side of the recessed portion. Conversely, a twisting suppression effect can be set larger as this position is closer to the recessed portion opening side or falls outside the recessed portion.

In contrast, if the gap 27 formed by bending the insertion portion 9A forms a closed space, the strength of the lens holding portion 9 against twisting can be further increased.

Also, when the portion inserted in the recessed portion 13 in the lens holding portion 9 is bent in an appropriate shape such as a cross shape, a three-leaf clover shape, or a heart shape, as shown in FIG. 26, 27, or 28, respectively, the design performance of spectacles can be improved because it can be visually recognized through the lens.

Moreover, when the twisting preventive portion 60 is formed on the lens holding portion 9, the lens holding portion 9 can be more reliably prevented from twisting.

A method of manufacturing spectacles having a lens holding structure as mentioned above will be described next.

First, recessed portions 12 and 13 (or a recessed portion 30, 33, or 43) are formed on edge surfaces 2c-a and 2c-h, respectively, of a spectacle lens 2. The recessed portions 12 and 13 are formed by punching holes in the lens inner and outer edge surfaces, respectively, at predetermined positions in predetermined directions using a ball end mill, as described above.

Also, insertion portions 5A and 9A of lens holding portions 5 and 9, respectively, are bent in predetermined shapes, as shown in FIGS. 7 to 29, in accordance with the shapes of the recessed portions 12 and 13, respectively. The lens holding portions 5 and 9 are formed by being bent using an appropriate jig.

Next, an adhesive 15 is filled into the recessed portions 12 and 13. Examples of methods of using the adhesive 15 include a method of filling the adhesive 15 into the recessed portions 12 and 13 before the lens holding portions 5 and 9 are inserted into the recessed portions 12 and 13, respectively, a method of applying the adhesive 15 to the insertion portions 5A and 9A of the lens holding portions 5 and 9, respectively, before the lens holding portions 5 and 9 are inserted into the recessed portions 12 and 13, respectively, and a combination thereof. However, the former method will be taken as an example hereinafter.

Figure 31:
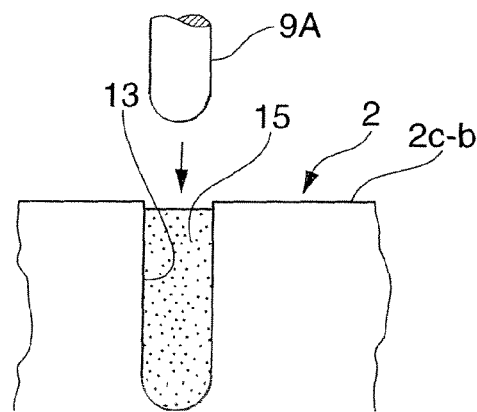
FIG. 31 is a sectional view showing the state in which a recessed portion is filled with an adhesive.

FIG. 31 is a sectional view taken in the thickness directions of the recessed portions 12 and 13 filled with the adhesive 15. The adhesive 15 (e.g., an epoxy adhesive) is filled into the recessed portion 13 up to the vicinity of the opening of the recessed portion 13 in advance. In this state, the insertion portions 5A and 9A of the lens holding portions 5 and 9, respectively, are gently inserted into the recessed portions 12 and 13, respectively, the extra adhesive 15 is pushed out of the recessed portions 12 and 13, and the spilled adhesive 15 is cleanly wiped off. If the adhesive 15 spills out in so large an amount that the adhesive 15 which fills the recessed portions 12 and 13 runs short, more adhesive 15 is supplemented.

If air bubbles remain in the recessed portions 12 and 13 upon filling the recessed portions 12 and 13 with the adhesive 15, or upon inserting the insertion portions 5A and 9A into the recessed portions 12 and 13, respectively, filled with the adhesive 15, they are visually recognized through the spectacle lens 2, and this causes disfigurement of the spectacle lens 2. In addition, this decreases the bonding strength of the adhesive 15. To prevent this, after the lens holding portions 5 and 9 are inserted into the recessed portions 12 and 13, respectively, filled with the adhesive 15, the lens holding portions 5 and 9 to which the spectacle lens 2 is attached are placed in a vacuum degassing device to degas the recessed portions 12 and 13. Thus, the air bubbles generated by the adhesive 15 can be removed to obtain a high bonding strength, and the appearance of the spectacle lens 2 can be improved. Note that it is more preferable to perform vacuum degassing as well before the lens holding portions 5 and 9 are inserted into the recessed portions 12 and 13, respectively, after the adhesive 15 is filled into the recessed portions 12 and 13. After the vacuum degassing, the adhesive 15 is cured. The adhesive 15 may be cured by natural drying or artificial drying by means of heating. To prevent bubbles from being generated, a process (e.g., an ozone treatment) for improving the wettabilities of the insertion portions 5A and 9A is preferably performed on the surfaces of the insertion portions 5A and 9A in advance before the lens holding portions 5 and 9 are inserted into the recessed portions 12 and 13, respectively. When the adhesive 15 in the gaps or spaces between the recessed portions 12 and 13 and the insertion portions 5A and 9A, respectively, cures in the foregoing way, the insertion portions 5A and 9A are held by the lens holding portions 5 and 9, respectively, while being fixed in the recessed portions 12 and 13, respectively. In this manner, spectacle lenses 2 are attached to a spectacle frame 3, and spectacles 1 is thus completed.

The present invention is not particularly limited to the above-mentioned embodiments, and the shapes of the lens holding portions 5 and 9 and recessed portions 12 and 13, for example, can be appropriately changed or modified without departing from the scope of the present invention.

The invention claimed is:

1. A holding structure for spectacle lenses comprising
   a lens holding member which holds a spectacle lens in rimless type spectacles,
   wherein a recessed portion that is a flat hole which is narrow in a lens thickness direction is formed in an edge surface of the spectacle lens,
   said lens holding member comprises a wire-like lens holding portion which has one end connected to a main body of said lens holding member and is bent on a single plane, and is formed by being fixed in position using an adhesive while at least part of said lens holding portion is inserted in the recessed portion, and
   said lens holding portion comprises a bottom portion side bent portion bent along a bottom of the recessed portion, a proximal portion which connects one end of said bottom side bent portion to the main body of said lens holding member, and an extension portion extending from the other end of said bottom portion side bent portion.

2. A holding structure for spectacle lenses according to claim 1, wherein the adhesive solidified upon being filled into the recessed portion in said bottom portion side bent portion on a side of an opening thereof forms a fall-off preventive portion by bonding inner walls of the recessed portion, which are opposed to each other in the lens thickness direction.

3. A holding structure for spectacle lenses according to claim 2, wherein a distal end of said extension portion of said lens holding portion is positioned on an inner side with respect to the opening of the recessed portion.

4. A holding structure for spectacle lenses according to claim 2, wherein a distal end of said extension portion of said lens holding portion is positioned in the opening of the recessed portion.

5. A holding structure for spectacle lenses according to claim 2, wherein a distal end of said extension portion of said lens holding portion projects outside the opening of the recessed portion.

6. A holding structure for spectacle lenses according to claim 5, wherein the distal end of said extension portion of said lens holding portion is connected to said proximal portion on the outside of the opening of the recessed portion.

7. A holding structure for spectacle lenses according to claim 5, wherein the distal end of said extension portion of said lens holding portion is fitted with an ornament.

8. A holding structure for spectacle lenses according to claim 2, wherein the fall-off preventive portion reaches the opening of the recessed portion.

9. A holding structure for spectacle lenses according to claim 1, wherein an inner surface of the recessed portion includes a pair of parallel inner walls opposed in the lens thickness direction, and an inner edge surface which connects peripheral edges of the pair of inner wall surfaces, the inner edge surface includes a bottom portion positioned in the bottom of the recessed portion, and a pair of side portions which reach the opening of the recessed portion from two ends, respectively, of the bottom portion, and said bottom portion side bent portion of said lens holding portion is bent along the bottom portion of the recessed portion.

10. A holding structure for spectacle lenses according to claim 9, wherein the pair of side portions of the recessed portion have at least one of a constant interval therebetween, and an interval therebetween, that gets larger in a direction closer to the opening, and the bottom portion of the recessed portion includes one of a portion flat in a widthwise direction, and a portion recessed in the widthwise direction.

11. A holding structure for spectacle lenses according to claim 9, wherein said proximal portion of said lens holding portion includes a portion in proximity to one of the pair of side portions of the recessed portion, and said extension portion of said lens holding portion includes a portion in proximity to the other one of the pair of side portions of the recessed portion.

12. A holding structure for spectacle lenses according to claim 9, wherein in said proximal portion of said lens holding portion, a portion positioned in the opening of the recessed portion is in proximity to one of the pair of side portions of the recessed portion.

13. A holding structure for spectacle lenses according to claim 9, wherein a portion which comprises said at least part of said lens holding portion, which is inserted in the recessed portion, matches the inner edge surface of the recessed portion.

14. A holding structure for spectacle lenses according to claim 1, wherein said proximal portion and said extension portion of said lens holding portion in the portion inserted in the recessed portion in said lens holding portion have at least one of a constant interval therebetween in a widthwise direction of the recessed portion, and an interval therebetween in the widthwise direction of the recessed portion, that gets larger in a direction closer to the opening.

15. A holding structure for spectacle lenses according to claim 1, wherein said proximal portion of said lens holding portion includes a twisting preventive portion with a noncircular cross-sectional shape in one of a portion which comprises said at least part of said lens holding portion, which is inserted in the recessed portion, and a portion across the opening.

16. A holding structure for spectacle lenses according to claim 15, wherein said twisting preventive portion of said lens holding portion is formed in a flat shape parallel to the recessed portion.

17. A holding structure for spectacle lenses according to claim 1, wherein said lens holding member includes one of an end piece and a bridge.

18. Spectacles comprising a holding structure for spectacle lenses defined in claim 1.

19. A method of manufacturing spectacles defined in claim 18, comprising the steps of:

forming a recessed portion in an edge surface of a spectacle lens;

filling the recessed portion with an adhesive;

inserting a lens holding portion of a lens holding member into the recessed portion;

performing vacuum degassing of the adhesive; and curing the adhesive.

\* \* \* \* \*